United States Patent
Choi et al.

(10) Patent No.: US 8,802,320 B2
(45) Date of Patent: Aug. 12, 2014

(54) ELECTROLYTIC MEMBRANE COMPRISING A CRYSTALLINE ORGANIC AND INORGANIC POROUS COMPOSITE FOR FUEL CELL, ELECTRODE AND FUEL CELL, AND FUEL CELL INCLUDING THE ELECTROLYTIC MEMBRANE AND/OR THE ELECTRODE

(75) Inventors: Seong-woo Choi, Yongin-si (KR);
Ki-hyun Kim, Yongin-si (KR);
Kyo-sung Park, Seongnam-si (KR);
Seon-ah Jin, Pocheon-si (KR)

(73) Assignee: Samsung Electronics Co., Ltd. (KR)

( * ) Notice: Subject to any disclaimer, the term of this patent is extended or adjusted under 35 U.S.C. 154(b) by 359 days.

(21) Appl. No.: 13/271,632

(22) Filed: Oct. 12, 2011

(65) Prior Publication Data
US 2012/0244453 A1   Sep. 27, 2012

(30) Foreign Application Priority Data

Mar. 25, 2011   (KR) .................... 10-2011-0027177

(51) Int. Cl.
*H01M 8/10*   (2006.01)
(52) U.S. Cl.
USPC .......................................... 429/493; 429/523
(58) Field of Classification Search
USPC ............ 429/493, 492, 450, 530, 523; 521/25, 521/27; 252/62.2
See application file for complete search history.

(56) References Cited

U.S. PATENT DOCUMENTS

| | | |
|---|---|---|
| 5,648,508 A | 7/1997 | Yaghi |
| 6,962,959 B2 | 11/2005 | Kurano et al. |
| 2005/0256296 A1 | 11/2005 | Kiefer et al. |
| 2006/0286422 A1 | 12/2006 | Nakato et al. |
| 2007/0202038 A1 | 8/2007 | Yaghi et al. |
| 2008/0075999 A1* | 3/2008 | Izuhara et al. ................. 429/33 |
| 2009/0186252 A1* | 7/2009 | Park et al. ..................... 429/33 |

FOREIGN PATENT DOCUMENTS

| | | |
|---|---|---|
| KR | 10-2003-0034740 | 5/2003 |
| KR | 10-0552661 | 2/2006 |
| KR | 10-2006-0063379 | 6/2006 |
| KR | 10-0714361 | 4/2007 |
| KR | 10-2008-0100607 | 11/2008 |
| KR | 10-0928293 | 11/2009 |

OTHER PUBLICATIONS

English abstract 1020090073815 (Jul. 2009).
English abstract 1020060048001 (May 2006).
English abstract 1020030034740 (May 2003).
B. F. Hoskins et al., Design and Construction of a New Class of Scaffolding-like Materials Comprising Infinite Polymeric Frameworks of 3D-Linded Molecular Rods. A Reappraisal of the Zn(CN)2 and Cd(CN)2 Structures and the Synthesis and Structure of the Diamond-Related Frameworks [N(CH3)4][CuIZnII(CN)4] and CuI[4,4',4",4'"-tetracyanotetraphenylmethane]BF4 xC6H5NO2, J. Am. Chem. Soc. 1990, 112, pp. 1546-1554.

(Continued)

*Primary Examiner* — Kenneth Douyette
(74) *Attorney, Agent, or Firm* — Cantor Colburn LLP

(57) ABSTRACT

An electrolytic membrane for a fuel cell including a crystalline organic and inorganic porous composite, an electrode for a fuel cell including a crystalline organic and inorganic porous composite, and a fuel cell including the electrolytic membrane and/or the electrode.

20 Claims, 5 Drawing Sheets

(56) References Cited

OTHER PUBLICATIONS

Hailian Li et al., Design and synthesis of an exceptionally stable and highly porous metal-organic framework, Nature, letters to nature, vol. 42, Nov. 18, 1999, pp. 276-279.

Kyo Sung Park et al., Exceptional chemcial and thermal stability of zeolitic imidazolate frameworks, PNAS, vol. 103, No. 27, Jul. 5, 2006, pp. 10186-10191.

* cited by examiner

ELECTROLYTIC MEMBRANE COMPRISING A CRYSTALLINE ORGANIC AND INORGANIC POROUS COMPOSITE FOR FUEL CELL, ELECTRODE AND FUEL CELL, AND FUEL CELL INCLUDING THE ELECTROLYTIC MEMBRANE AND/OR THE ELECTRODE

CROSS-REFERENCE TO RELATED APPLICATION

This application claims the benefit of Korean Patent Application No. 10-2011-0027177, filed on Mar. 25, 2011 in the Korean Intellectual Property Office, the disclosure of which is incorporated herein in its entirety by reference.

BACKGROUND

1. Field

Aspects of the present disclosure relate to electrolytic membranes for a fuel cell, electrodes for a fuel cell, and fuel cells including the electrolytic membranes and/or the electrodes.

2. Description of the Related Art

Fuel cells are clean energy sources that may be used as future alternatives to fossil energy. Fuel cells have high output density and high energy conversion efficiency and, due to such characteristics, fuel cells have a wide application range including pollution-free vehicles, power generation systems for home use, and portable electronic devices, such as mobile communication equipment, medical devices, military equipment, or space industry devices.

A fuel cell includes a cathode, an anode, and an electrolytic membrane interposed between the cathode and the anode. A fuel gas is supplied to the anode and oxygen is supplied to the cathode, so that an oxidation reaction of the fuel gas occurs at the anode and a reduction reaction of oxygen occurs at the cathode. These reactions occurring at the cathode and the anode result in a flow of electrons, thereby generating electricity, and heat and water as byproducts.

Regarding a high-temperature fuel cell, a phosphoric acid is mainly used as an electrolyte. In this system, an electrolytic membrane needs to sufficiently absorb the phosphoric acid, to prevent leakage of the phosphoric acid, and to have excellent durability.

However, currently known electrolytic membranes have unsatisfactory phosphoric acid contents and phosphoric acid leakage prevention characteristics, and thus, efficiency of a fuel cell including such electrolytic membranes is not satisfactory.

SUMMARY

Aspects of the present invention provide electrolytic membranes for a fuel cell having improved conductivity and processibility, electrodes for a fuel cell having improved conductivity and processibility, and fuel cells having improved performance due to inclusion therein of the electrolytic membranes and/or the electrodes.

According to an aspect of the present invention, an electrolytic membrane for a fuel cell includes a polymer of a composition that includes: a crystalline organic and inorganic porous composite; and at least one compound selected from the group consisting of compounds represented by Formulae 1 through 6 below:

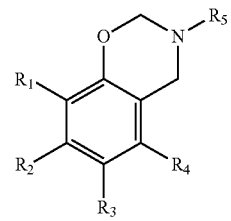

[Formula 1]

wherein in Formula 1, $R_1$, $R_2$, $R_3$ and $R_4$ are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, and $R_5$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group,

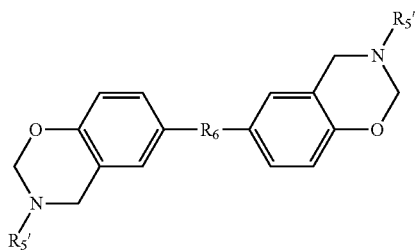

[Formula 2]

wherein in Formula 2, $R_5$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and $R_6$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, or —SO$_2$—,

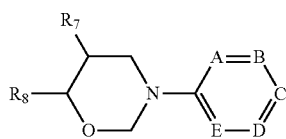

[Formula 3]

wherein in Formula 3, A, B, C, D, and E all are carbon atoms, or one or two selected from A, B, C, D, and E are nitrogen atoms (N), and the others are carbon atoms (C), and $R_7$ and $R_8$ are connected to each other to form a ring and the ring is a C6-C10 cycloalkyl group, a C3-C10 heteroaryl group, a fused C3-C10 heteroaryl group, a C3-C10 heterocyclic group, or a fused C3-C10 heterocyclic group,

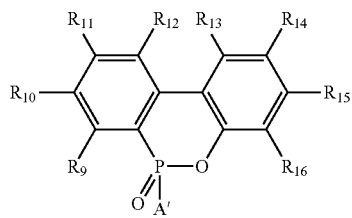

[Formula 4]

wherein in Formula 4, A' is a substituted or unsubstituted C1-C20 heterocyclic group, a substituted or unsubstituted C4-C20 cycloalkyl group, or a substituted or unsubstituted C1-C20 alkyl group, and $R_9$ to $R_{16}$ are each independently hydrogen, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

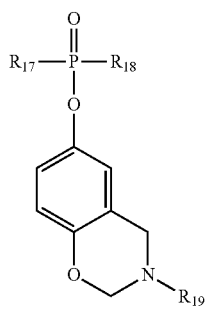

[Formula 5]

wherein in Formula 5, $R_{17}$ and $R_{18}$ are each independently a C1-C20 alkyl group, a C1-C20 alkoxy group, a C6-C20 aryl group, a C6-C20 aryloxy group, or a group represented by Formula 5A below:

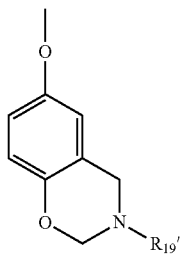

[Formula 5A]

wherein in Formulae 5 and 5A, $R_{19}$ and $R_{19'}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group, and

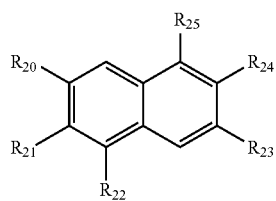

[Formula 6]

wherein in Formula 6, two or more neighboring groups selected from $R_{20}$, $R_{21}$ and $R_{22}$ are connected to form a ring represented by Formula 6A below, and the unselected groups selected from $R_{20}$, $R_{21}$ and $R_{22}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, two or more neighboring groups selected from $R_{23}$, $R_{24}$ and $R_{25}$ are connected to form a ring represented by Formula 6A below, and the unselected groups selected from $R_{23}$, $R_{24}$ and $R_{25}$ are each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group:

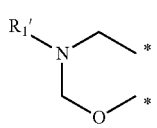

[Formula 6A]

wherein in Formula 6A, $R_1$' is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and

* represents a linking site for connection with two or more neighboring groups of $R_{20}$, $R_{21}$, and $R_{22}$ of Formula 6 or two or more neighboring groups of $R_{23}$, $R_{24}$, and $R_{25}$ of Formula 6.

According to another aspect of the present invention, an electrode for a fuel cell includes: a composition including a crystalline organic and inorganic porous composite and at least one compound selected from the group consisting of compounds represented by Formulae 1 through 6 below, or a polymer as a polymerization product of the composition:

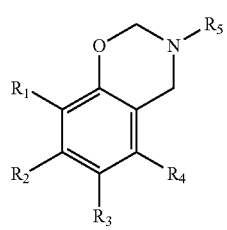

[Formula 1]

wherein in Formula 1, $R_1$, $R_2$, $R_3$ and $R_4$ are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, and $R_5$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group,

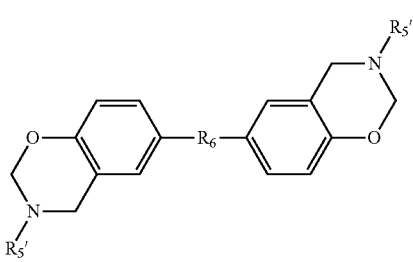

[Formula 2]

wherein in Formula 2, $R_5'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and $R_6$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, or —SO$_2$—,

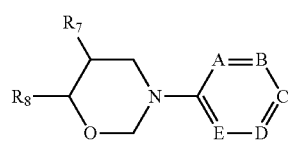

[Formula 3]

wherein in Formula 3, A, B, C, D, and E all are carbon atoms, or one or two selected from A, B, C, D, and E are nitrogen atoms (N), and the others are carbon atoms (C), and $R_7$ and $R_8$ are connected to each other to form a ring and the ring is a C6-C10 cycloalkyl group, a C3-C10 heteroaryl group, a fused C3-C10 heteroaryl group, a C3-C10 heterocyclic group, or a fused C3-C10 heterocyclic group,

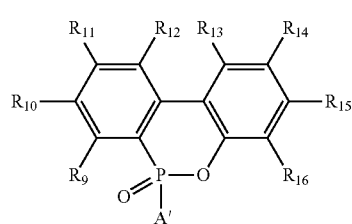

[Formula 4]

wherein in Formula 4, A' is a substituted or unsubstituted C1-C20 heterocyclic group, a substituted or unsubstituted C4-C20 cycloalkyl group, or a substituted or unsubstituted C1-C20 alkyl group, and $R_9$ to $R_{16}$ are each independently hydrogen, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

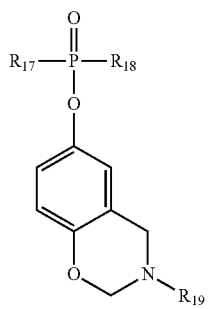

[Formula 5]

wherein in Formula 5, $R_{17}$ and $R_{18}$ are each independently a C1-C20 alkyl group, a C1-C20 alkoxy group, a C6-C20 aryl group, a C6-C20 aryloxy group, or a group represented by Formula 5A below:

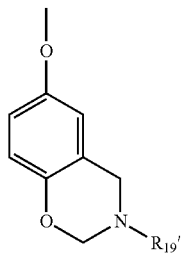

[Formula 5A]

wherein in Formulae 5 and 5A, $R_{19}$ and $R_{19'}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group, and

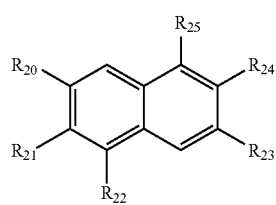

[Formula 6]

wherein in Formula 6, two or more neighboring groups selected from $R_{20}$, $R_{21}$ and $R_{22}$ are connected to form a ring represented by Formula 6A below, and the unselected groups selected from $R_{20}$, $R_{21}$ and $R_{22}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, and two or more neighboring groups selected from $R_{23}$, $R_{24}$ and $R_{25}$ are connected to form a ring represented by Formula 6A below, and the unselected groups selected from $R_{23}$, $R_{24}$ and $R_{25}$ are each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group:

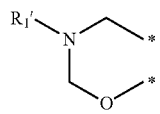

[Formula 6A]

wherein in Formula 6A, $R_1'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and

* represents a linking site for connection with two or more neighboring groups of $R_{20}$, $R_{21}$, and $R_{22}$ of Formula 6 or two or more neighboring groups of $R_{23}$, $R_{24}$, and $R_{25}$ of Formula 6.

According to another aspect of the present invention, a fuel cell includes the electrolytic membrane and/or the electrode as described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1:
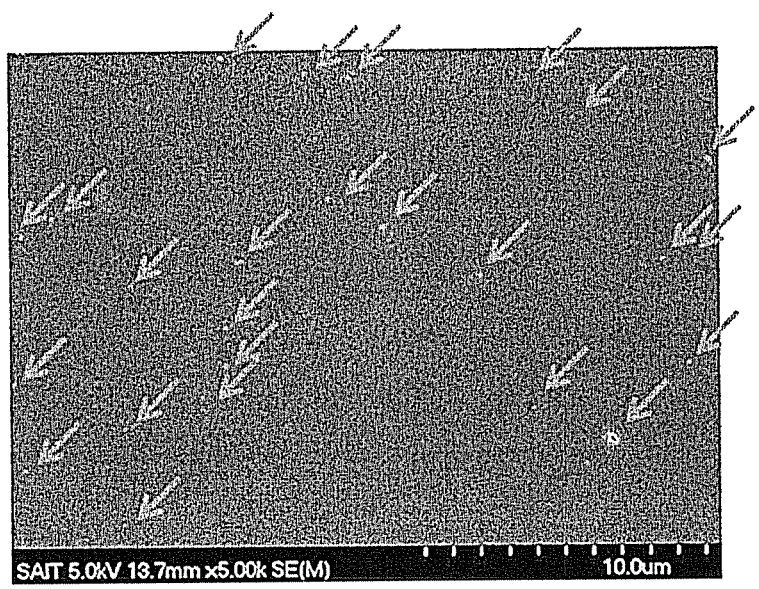
FIG. 1 is a scanning electron microscopy (SEM) image of an electrolytic membrane manufactured according to Example 2.

Reference will now be made in detail to the present embodiments of the present invention, examples of which are illustrated in the accompanying drawings. The embodiments are described below in order to explain the present invention by referring to the figures.

An electrolytic membrane for a fuel cell according to an embodiment of the present invention includes a polymer as a polymerization product of a composition that includes a crystalline organic and inorganic porous composite and at least one compound selected from the group consisting of compounds represented by Formulae 1 through 6 below:

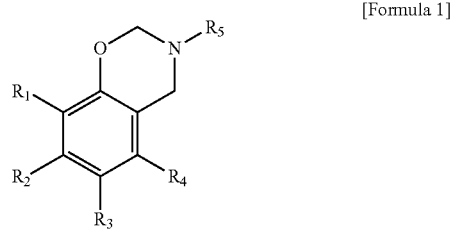

[Formula 1]

wherein in Formula 1, $R_1$, $R_2$, $R_3$ and $R_4$ are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, and $R_5$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group,

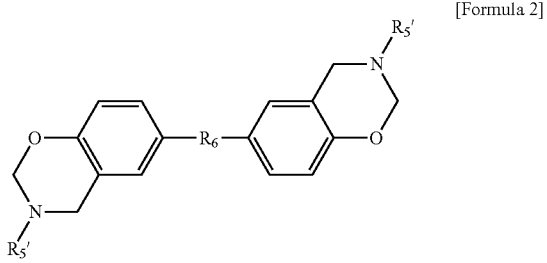

[Formula 2]

wherein in Formula 2, $R_5'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and $R_6$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, or —SO$_2$—,

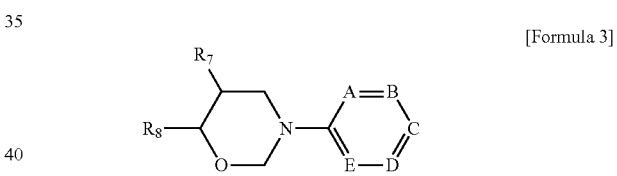

[Formula 3]

wherein in Formula 3, A, B, C, D, and E all are carbon atoms, or one or two selected from A, B, C, D, and E are nitrogen atoms (N), and the others are carbon atoms (C), and $R_7$ and $R_8$ are connected to each other to form a ring and the ring is a C6-C10 cycloalkyl group, a C3-C10 heteroaryl group, a fused C3-C10 heteroaryl group, a C3-C10 heterocyclic group, or a fused C3-C10 heterocyclic group,

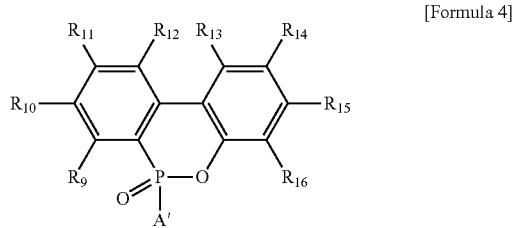

[Formula 4]

wherein in Formula 4, A' is a substituted or unsubstituted C1-C20 heterocyclic group, a substituted or unsubstituted C4-C20 cycloalkyl group, or a substituted or unsubstituted C1-C20 alkyl group, and $R_9$ to $R_{16}$ are each independently hydrogen, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

[Formula 5]

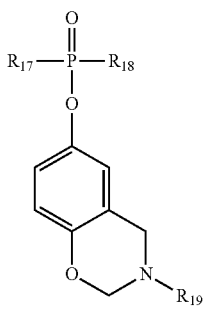

wherein in Formula 5, $R_{17}$ and $R_{18}$ are each independently a C1-C20 alkyl group, a C1-C20 alkoxy group, a C6-C20 aryl group, a C6-C20 aryloxy group, or a group represented by Formula 5A below:

[Formula 5A]

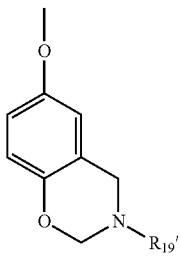

wherein in Formulae 5 and 5A, $R_{19}$ and $R_{19'}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group, and

[Formula 6]

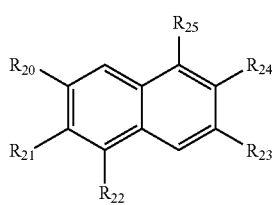

wherein in Formula 6, two or more neighboring groups selected from $R_{20}$, $R_{21}$ and $R_{22}$ are connected to form a ring represented by Formula 6A below, and the unselected groups selected from $R_{20}$, $R_{21}$ and $R_{22}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, and two or more neighboring groups selected from $R_{23}$, $R_{24}$ and $R_{25}$ are connected to form a ring represented by Formula 6A below, and the unselected groups selected from $R_{23}$, $R_{24}$ and $R_{25}$ are each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group:

[Formula 6A]

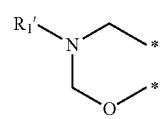

wherein in Formula 6A, $R_1'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and \* represents a linking site for connection with two or more neighboring groups of $R_{20}$, $R_{21}$, and $R_{22}$ of Formula 6 or two or more neighboring groups of $R_{23}$, $R_{24}$, and $R_{25}$ of Formula 6.

In Formula 6A, $R_1$ is one group selected from groups having the following structures:

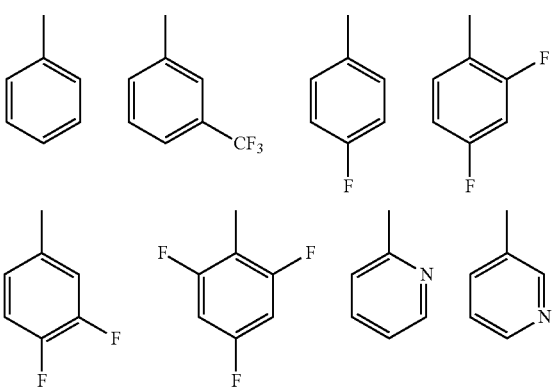

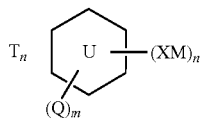

The crystalline organic and inorganic porous composite is a porous material having pores formed due to a regularly aligned metal and an organic material, and has a specific surface area of 11,000 m²/g or less, for example, about 1,000 to about 11,000 m²/g.

An average diameter of pores of the crystalline organic and inorganic porous composite is from about 0.4 to about 1 nm.

As described above, the crystalline organic and inorganic porous composite has a high specific surface area and a very small pore size. Also, the crystalline organic and inorganic porous composite has a metal and a ligand containing a proton-conducting group, and the pores are occupied with a proton-conducting compound.

Since the crystalline organic and inorganic porous composite has the proton-conducting compound, the crystalline organic and inorganic porous composite may act as a proton conductor, and when the crystalline organic and inorganic porous composite is used in a fuel cell, a non-water proton carrier may be used.

The crystalline organic and inorganic porous composite may be, for example, a compound represented by Formula 7 below:

[Formula 7]

$$T_n - U - (XM)_n$$
$$(Q)_m$$

wherein in Formula 7,

is a substituted or unsubstituted C6-C20 aryl, a substituted or unsubstituted C2-C20 heteroaryl, a substituted or unsubstituted C4-C20 carbocycle, or a substituted or unsubstituted C2-C20 heterocycle, X is a proton-conducting anion, M is selected from the group consisting of $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Cu^+$, $Ag^+$, $Au^+$, $Zn^{2+}$, $Cd^{2+}$, $Hg^{2+}$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Sr^+$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, and $Bi^+$, each $Q_m$ is a mono-substituted or poly-substituted substituent and each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, T is a substituted or unsubstituted C6-C20 aryl, a substituted or unsubstituted C2-C20 heteroaryl, a substituted or unsubstituted C4-C20 carbocycle, or a substituted or unsubstituted C2-C20 heterocycle, m is a number from about 0 to about 6, and n is a number from about 0 to about 6.

In Formula 7, when m and n all are 0, Q and XM all are hydrogen.

In Formula 1, T may be one group selected from groups represented by Formula 7A.

[Formula 7A]

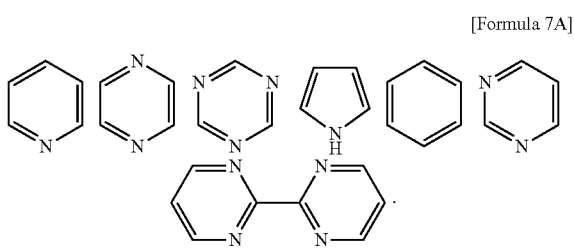

The proton-conducting anion may be, for example, $SO_3^-$, $PO_3^-$, a $COO^-$, or $OSO_3^-$.

The amount of the crystalline organic and inorganic porous composite is from about 0.1 to about 90 parts by weight based on 100 parts by weight of at least one compound selected from the group consisting of the compound represented by Formula 1 and/or Formula 2. When the amount of the crystalline organic and inorganic porous composite is within the range as described above, an electrolytic membrane having excellent conductivity is manufactured without a decrease in mechanical properties and processibility.

The crystalline organic and inorganic porous composite may be, for example, a compound represented by Formula 8 below:

[Formula 8]

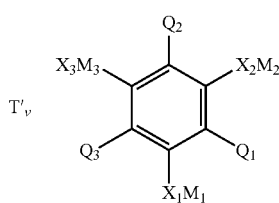

wherein in Formula 8, $X_1$ is $SO_3^-$, $PO_3^-$, a $COO^-$, or $OSO_3^-$, $M_1$, $M_2$ and $M_3$ are each independently $Na^+$, $H^+$, $Li^+$, $K^+$, $Rb^+$, or $Cs^+$, $Q_1$, $Q_2$ and $Q_3$ are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, T' is selected from groups represented by Formula 7A below:

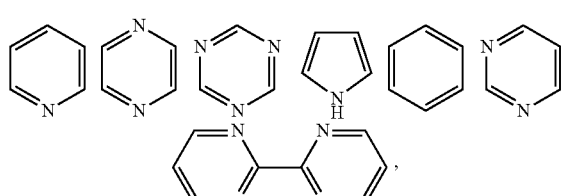

and

V is a number from about 0 to about 6.

A detailed example of the crystalline organic and inorganic porous composite is a compound ($[Na_3(C_6H_5(SO_3)_3)$ $(C_2N_3H_2)_{0.3}]_{nk}$) represented by Formula 9:

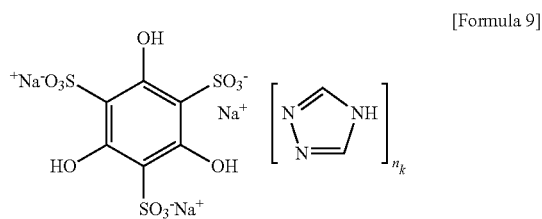

[Formula 9]

wherein in Formula 9, $n_k$ is a number from about 0.3 to about 0.6.

The compound represented by Formula 9 has a hydrophilic sulfonic acid as a proton-conducting group and a triazole and thus, may bond to a phosphoric acid as an electrolyte of a fuel cell, thereby preventing leakage of the phosphoric acid from an electrolytic membrane, and improving conductivity of the electrolytic membrane.

Hereinafter, an electrolytic membrane including a compound represented by Formula 117A below and a compound represented by Formula 9 below as an example of an electrolytic membrane according to an embodiment of the present invention will be described in detail.

When the compound represented by Formula 117A below and the compound represented by Formula 9 below are heat treated using a process of forming an electrolytic membrane according to an embodiment of the present invention, a polymer represented by Formula 117B and the compound represented by Formula 9 are produced as illustrated in Reaction Scheme 1:

[Reaction Scheme 1]

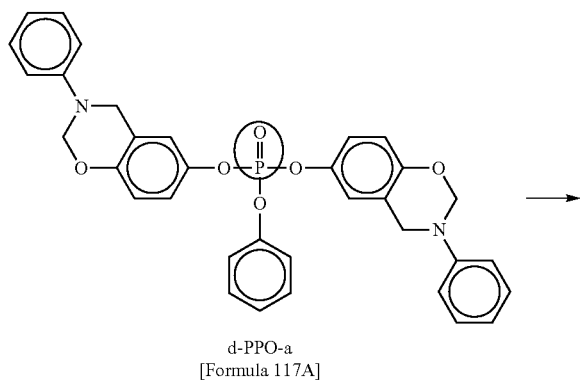

d-PPO-a
[Formula 117A]

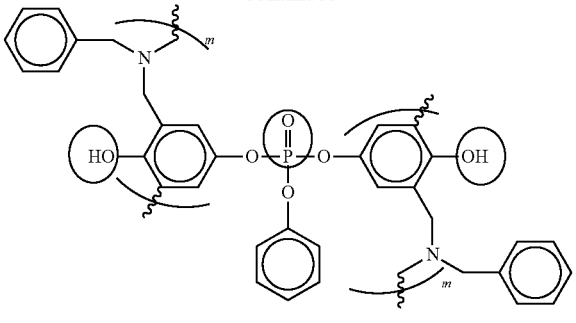

[Formula 117B]

wherein in Formula 117B, m is a number of about 5 to about 100,000.

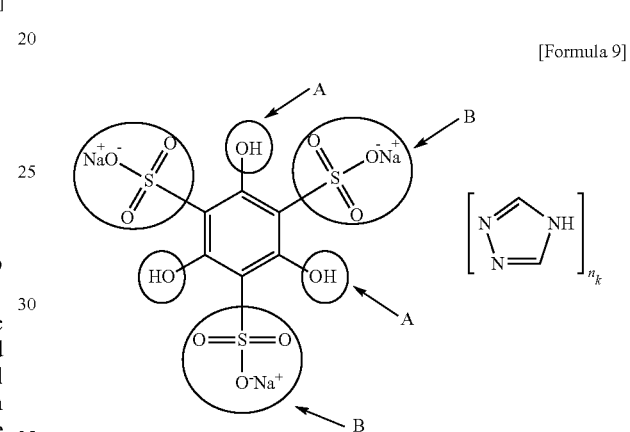

[Formula 9]

wherein in Formula 9, $n_k$ is a number from about 0.3 to about 0.6.

In Formulae 117A, 117B, and 9, a moiety where hydrogen bonding is possible is indicated by region A, and a moiety that is converted into a sulfonic acid group ($SO_3H$) by reaction with water generated when a fuel cell is driven is indicated by region B, and in the region B, hydrogen bonding is also possible.

The compound represented by Formula 117A and the polymer represented by Formula 117B have a hydrogen linkable site as illustrated above. As illustrated above, the compound represented by Formula 9 has many hydrogen linkable sites and a large specific surface area. Thus, if the compound represented by Formula 9 is used when an electrolytic membrane is formed using the compound represented by Formula 117A, an electrolytic membrane including the polymer represented by Formula 117B may have stronger structural rigidity through hydrogen bonding between the polymer represented by Formula 117B and the compound represented by Formula 9, and thus processibility, such as dimensional stability, of the electrolytic membrane may be improved.

For example, when the compound represented by Formula 117A is polymerized, a compound represented by Formula 11 below may be additionally used. When the compound represented by Formula 11 is used as described above, for example, a polymer represented by Formula 117C below is formed and the number of hydrogen bonded sites C is further increased. Thus, processibility of an electrolytic membrane including the polymer represented by Formula 117C and the compound represented by Formula 9 may be further improved:

[Formula 11]

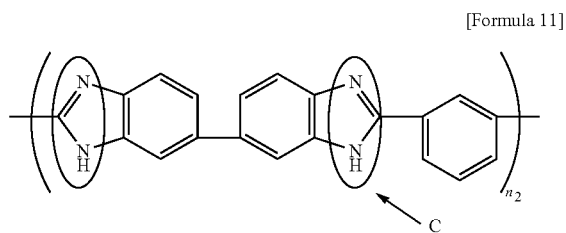

wherein in Formula 11, $n_2$ is a number from about 5 to about 100,000.

In Formula 11, a hydrogen linkable site is indicated by region C.

sented by Formula 1 and/or Formula 2 acts as a support of the electrolytic membrane and the crystalline organic and inorganic porous composite prevents leakage of a phosphoric acid from the electrolytic membrane to improve conductivity and processibility, such as dimensional stability, of the electrolytic membrane without a decrease in mechanical properties such as tensile strength. A fuel cell manufactured using the electrolytic membrane as described above has good cell performance.

Examples of the compound represented by Formula 1 above are compounds represented by Formulae 13 to 61 below:

[Formula 117C]

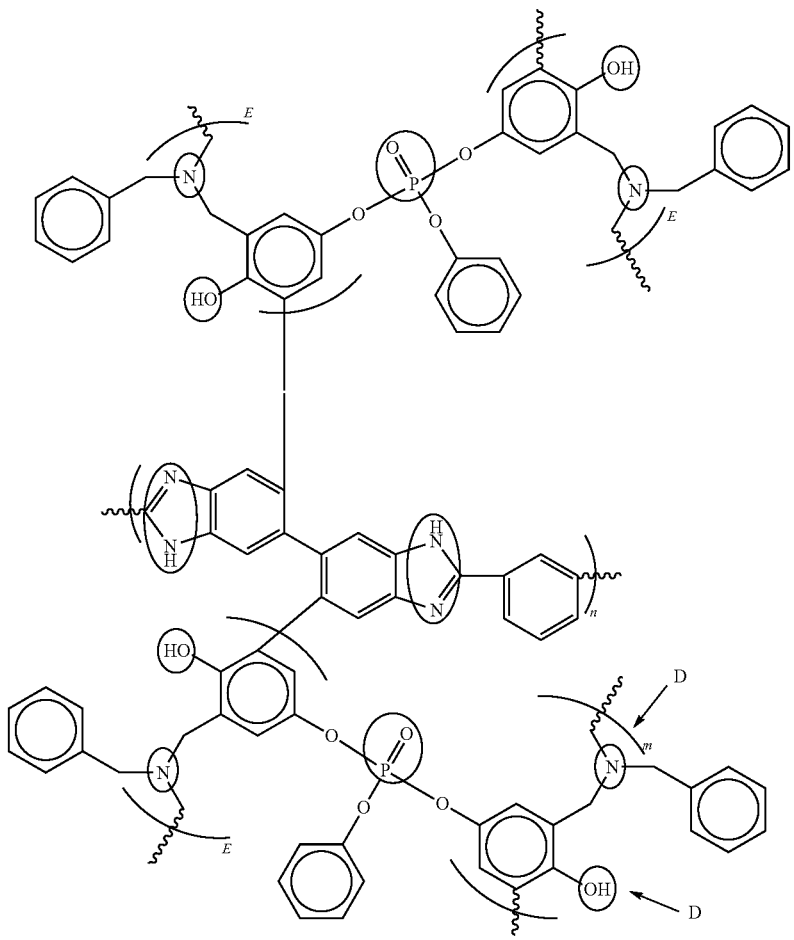

wherein in Formula 117C, m is a number from about 5 to about 100,000.

An electrode for a fuel cell according to an embodiment of the present invention includes: a composition including a crystalline organic and inorganic porous composite; and at least one compound selected from the group consisting of compounds represented by Formulae 1 through 6 below, or a polymer as a polymerization product of the composition.

In an electrolytic membrane according to an embodiment of the present invention, a polymer as a polymerization product of a composition including at least one compound selected from the group consisting of a compound repre-

[Formula 13]

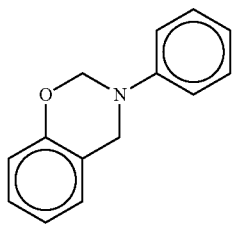

[Formula 14]
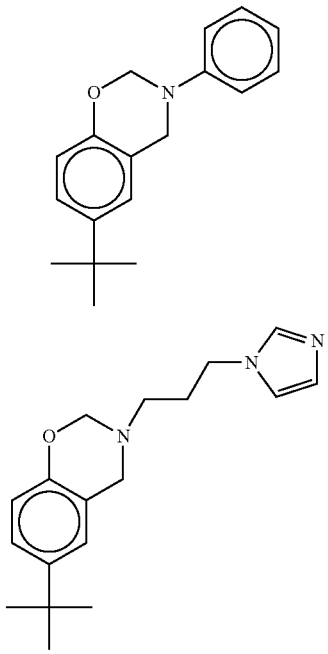
[Formula 15]
[Formula 16]
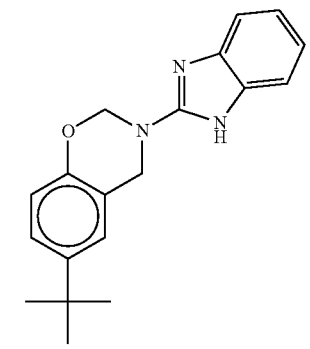
[Formula 17]
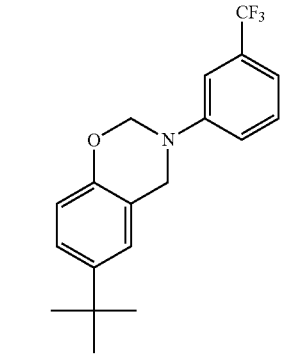
[Formula 18]
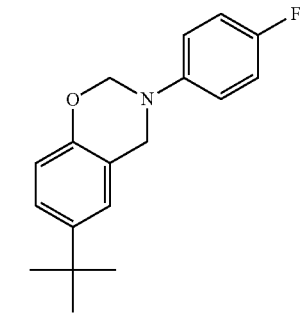
[Formula 19]
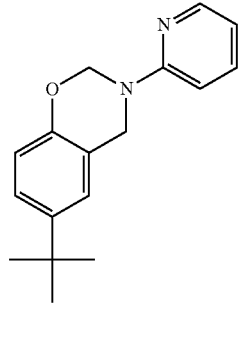
[Formula 20]
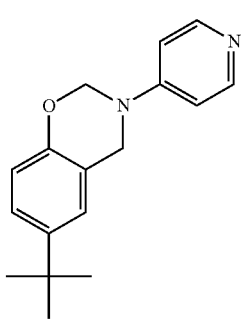
[Formula 21]
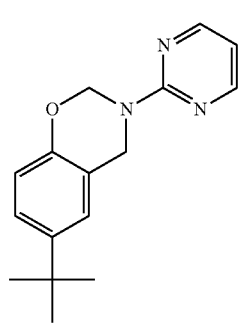
[Formula 22]
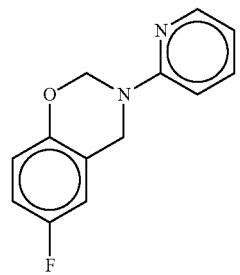
[Formula 23]
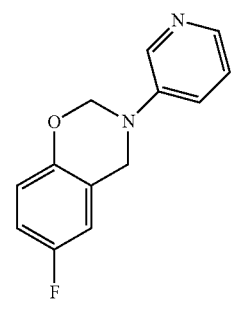

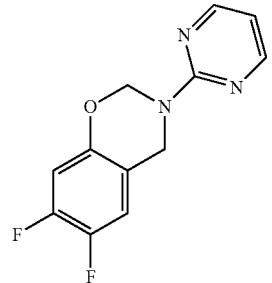
[Formula 24]
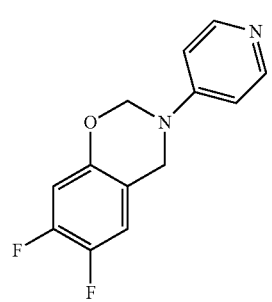
[Formula 25]
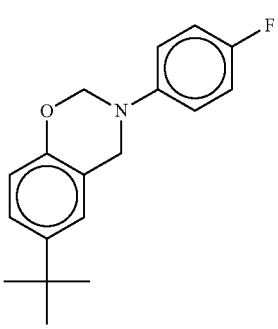
[Formula 26]
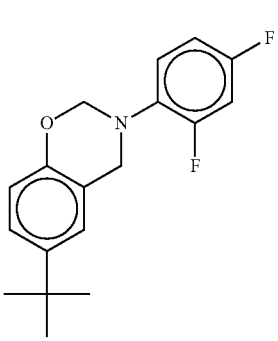
[Formula 27]
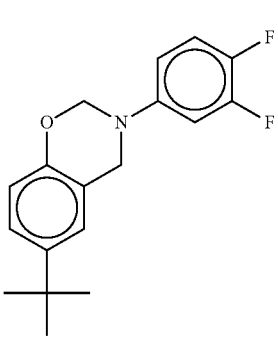
[Formula 28]
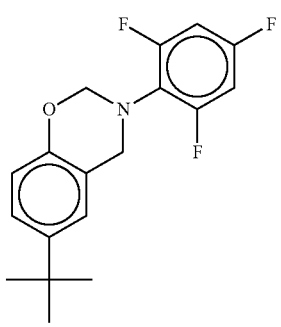
[Formula 29]
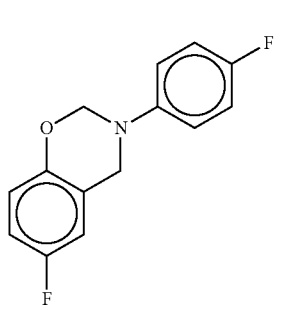
[Formula 30]
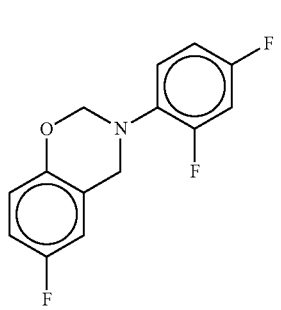
[Formula 31]
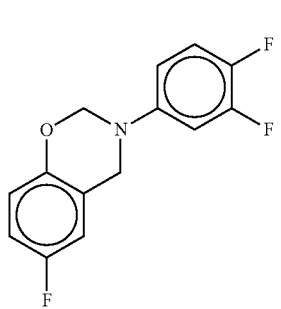
[Formula 32]
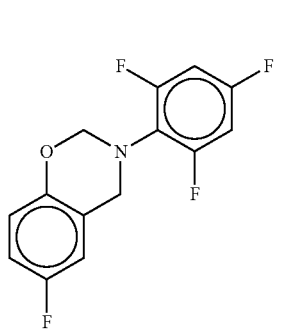
[Formula 33]

[Formula 34]
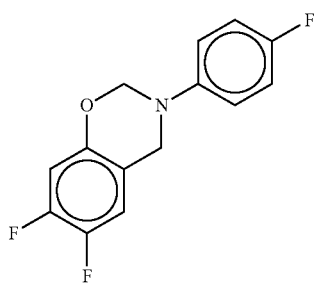
[Formula 35]
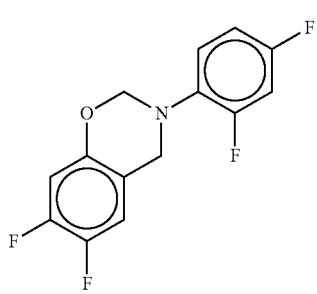
[Formula 36]
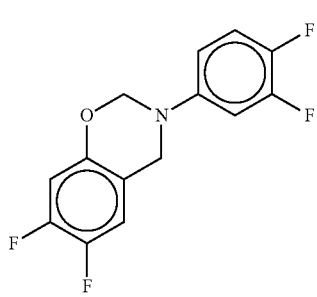
[Formula 37]
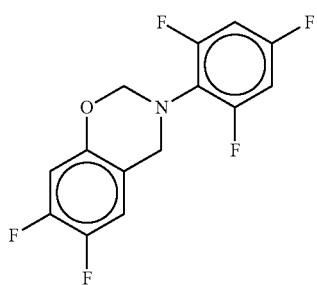
[Formula 38]
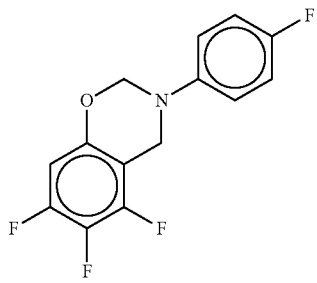
[Formula 39]
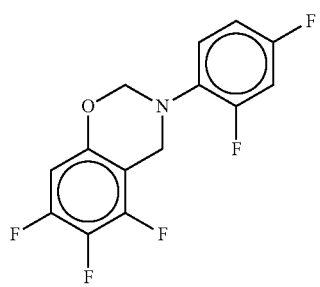
[Formula 40]
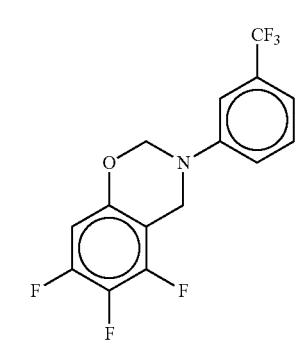
[Formula 41]
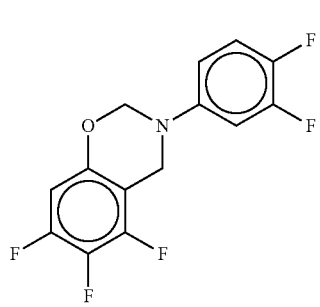
[Formula 42]
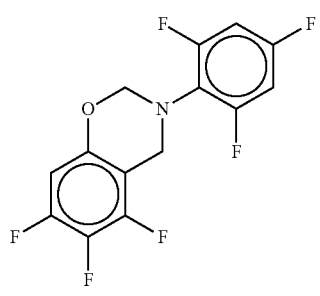
[Formula 43]
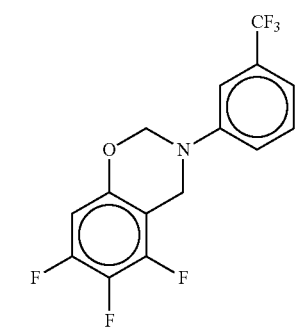

[Formula 44]
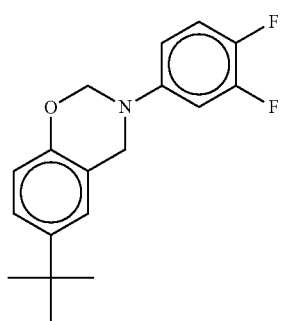
[Formula 45]
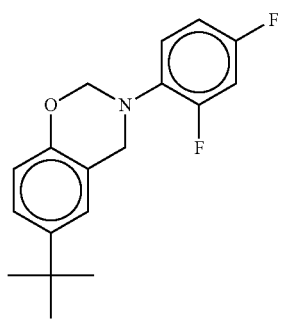
[Formula 46]
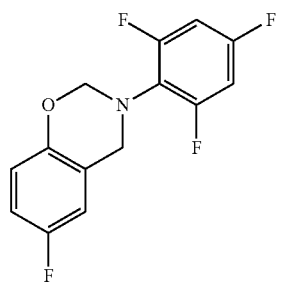
[Formula 47]
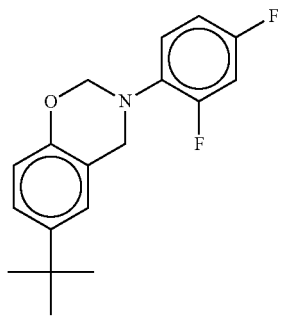
[Formula 48]
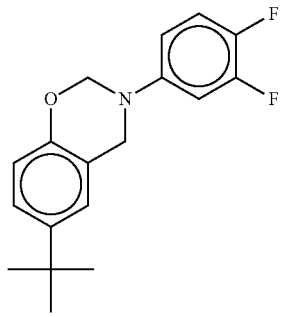
[Formula 49]
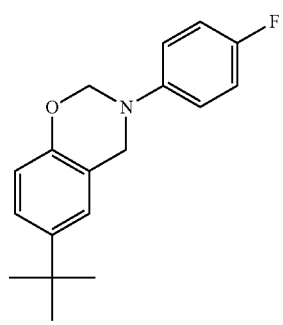
[Formula 50]
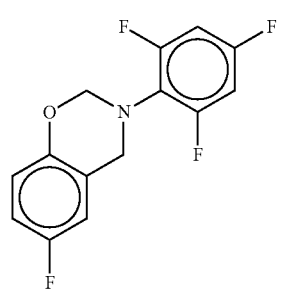
[Formula 51]
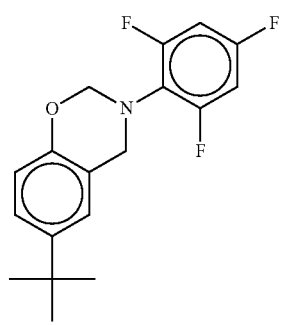
[Formula 52]
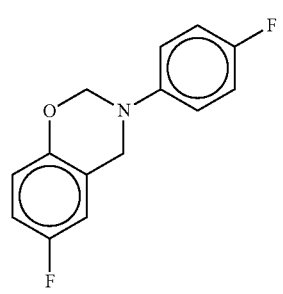
[Formula 53]
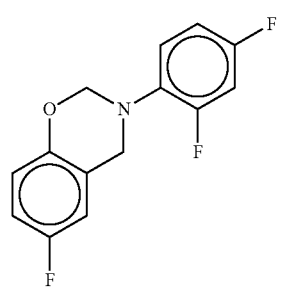

[Formula 54]
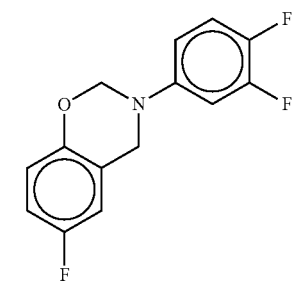
[Formula 55]
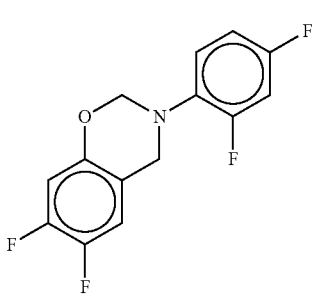
[Formula 56]
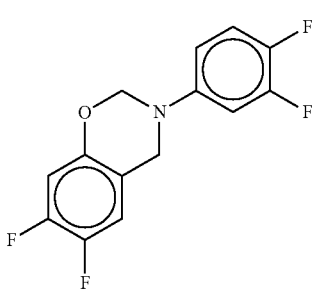
[Formula 57]
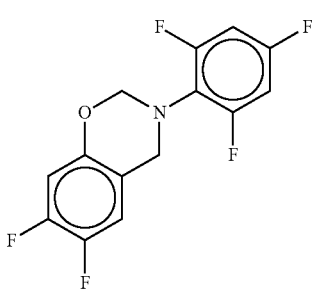
[Formula 58]
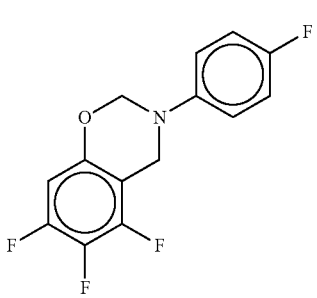
[Formula 59]
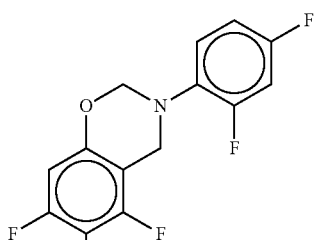
[Formula 60]
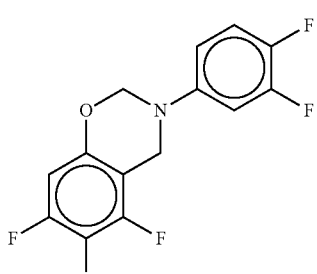
[Formula 61]
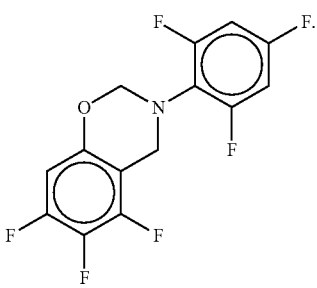
Examples of the compound represented by Formula 2 above are compounds represented by Formulae 62 to 66 below:
[Formula 62]
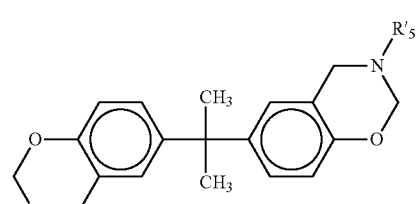
[Formula 63]
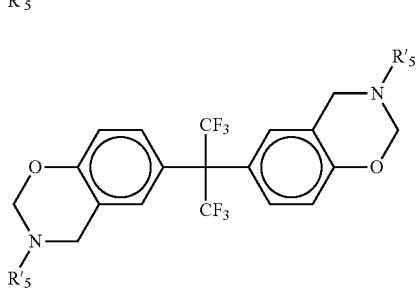

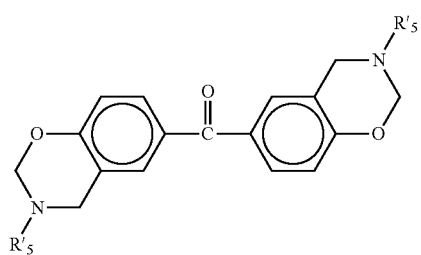
[Formula 64]
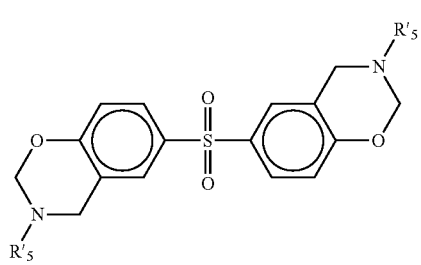
[Formula 65]
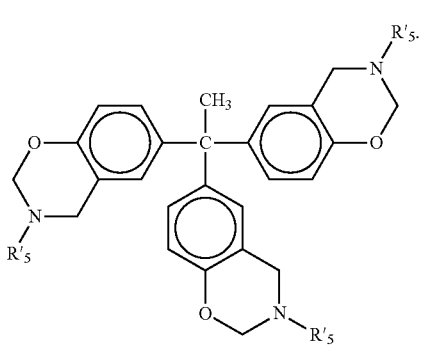
[Formula 66]
In Formulae 62 to 66, $R_{5'}$ is —CH$_2$—CH=CH$_2$, or one of the groups having structures illustrated in Formula 66A below:
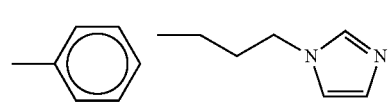
[Formula 66A]
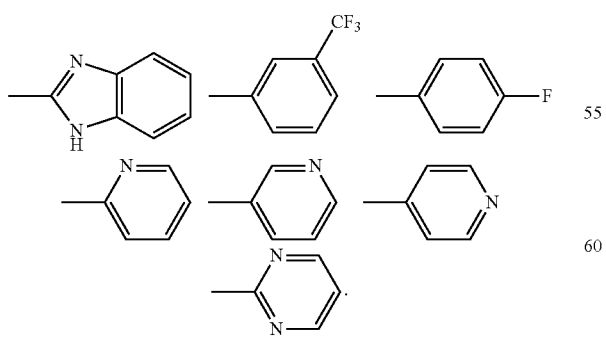
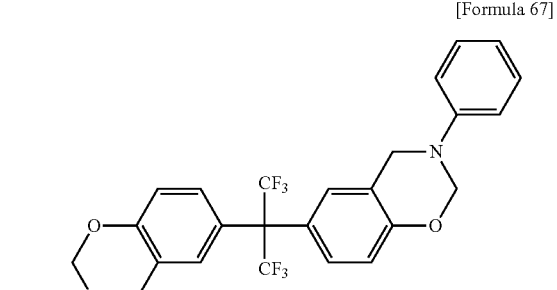
[Formula 67]
[Formula 68]
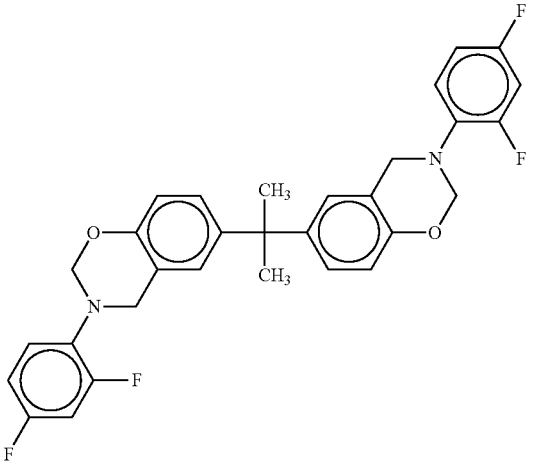
[Formula 69]
Detailed examples of the compound represented by Formula 2 are compounds represented by Formulae 67-70 below:

-continued

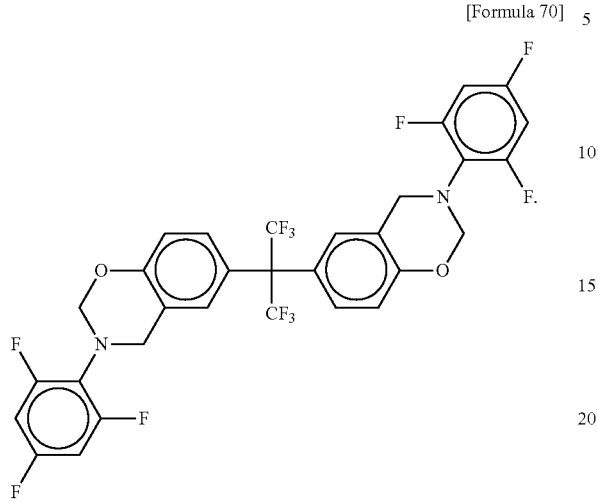
[Formula 70]

Examples of the compound represented by Formula 3 above are compounds represented by Formula 71 to 74 below:

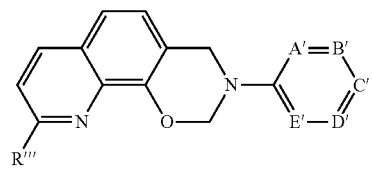
[Formula 71]

wherein in Formula 71, R''' is hydrogen or a C1-C10 alkyl group,

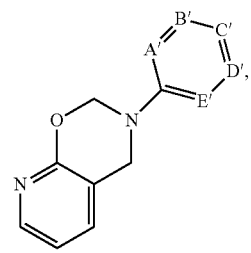
[Formula 72]

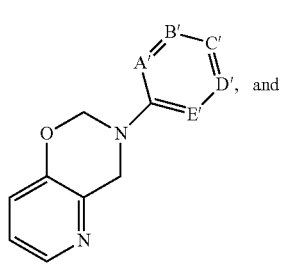
[Formula 73] and

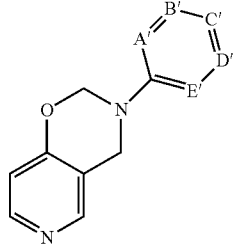
[Formula 74]

wherein in Formulae 71 to 74,

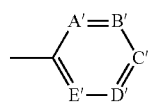

is one substituent selected from groups having the structures illustrated in Formula 74A below:

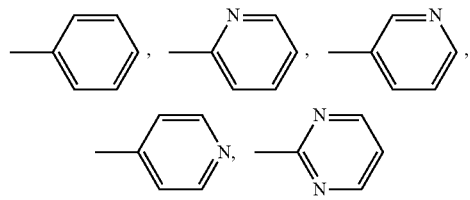
[Formula 74A]

Nonlimiting examples of the compound represented by Formula 3 are compounds represented by Formulae 75 to 95 below:

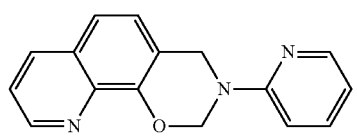
[Formula 75]

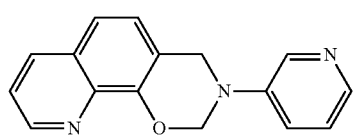
[Formula 76]

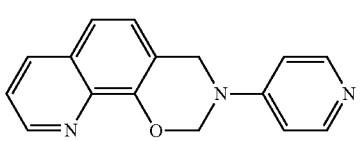
[Formula 77]

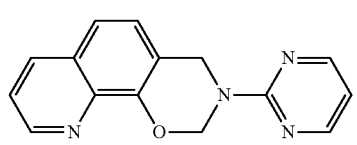
[Formula 78]

[Formula 79]
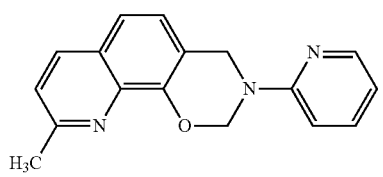
[Formula 80]
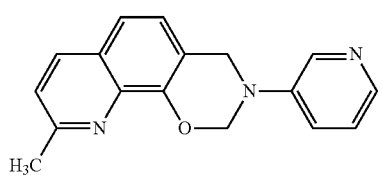
[Formula 81]
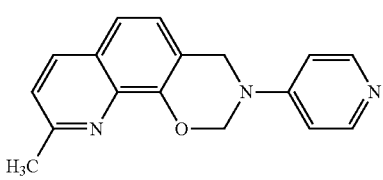
[Formula 82]
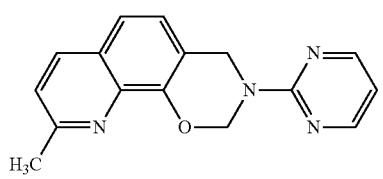
[Formula 83]
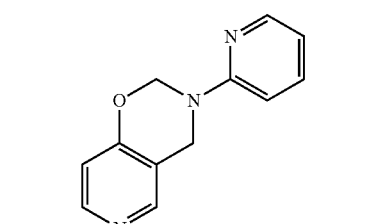
[Formula 84]
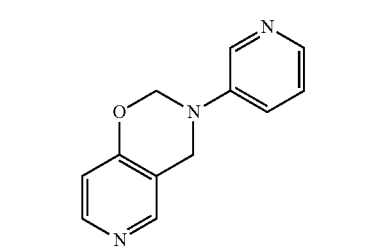
[Formula 85]
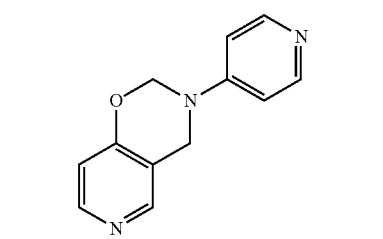
[Formula 86]
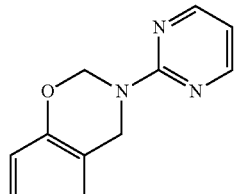
[Formula 87]
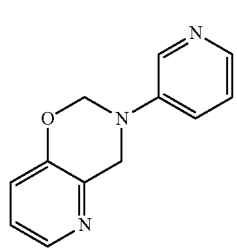
[Formula 88]
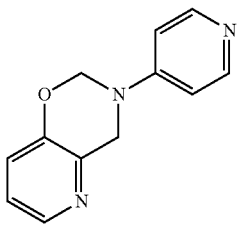
[Formula 89]
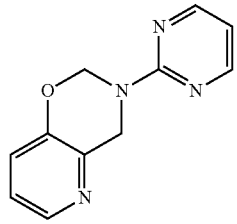
[Formula 90]
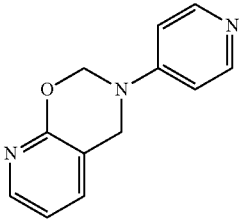
[Formula 91]
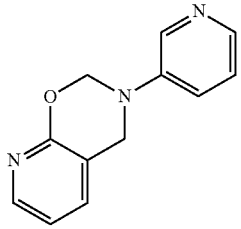
[Formula 92]
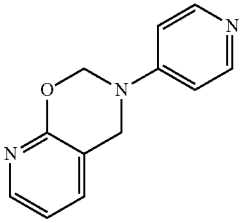

-continued

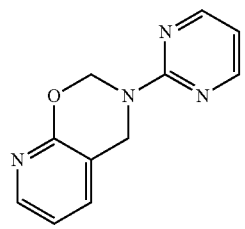
[Formula 93]

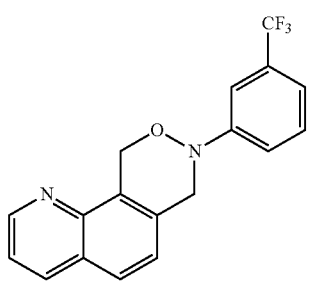
[Formula 94]

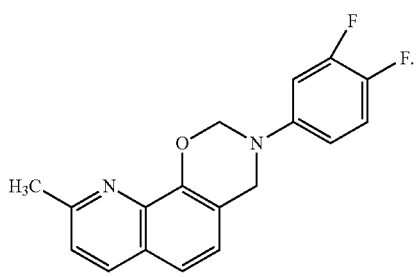
[Formula 95]

In the compound represented by Formula 4, A' may be a compound represented by Formulae 96 or 97 below:

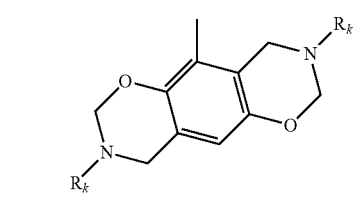
[Formula 96]

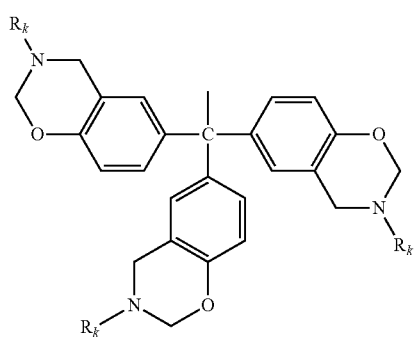
[Formula 97]

wherein in Formulae 96 and 97, $R_k$ is hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group.

The compound represented by Formula 4 may be a compound represented by Formulae 98 or 99 below:

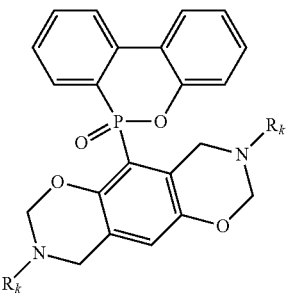
[Formula 98]

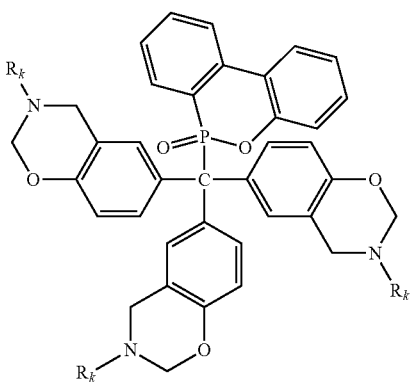
[Formula 99]

wherein in Formulae 98 and 99, $R_k$ may be one group selected from groups having the structures illustrated in Formula 99A below:

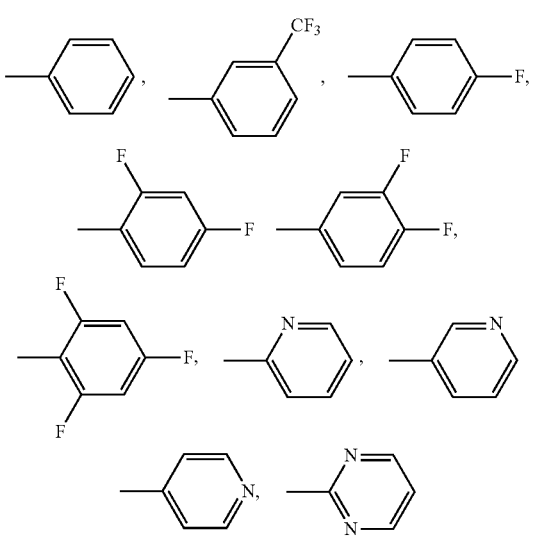
[Formula 99A]

Detailed examples of the compound represented by Formula 4 are compounds represented by Formulae 100 to 105:

[Formula 100]
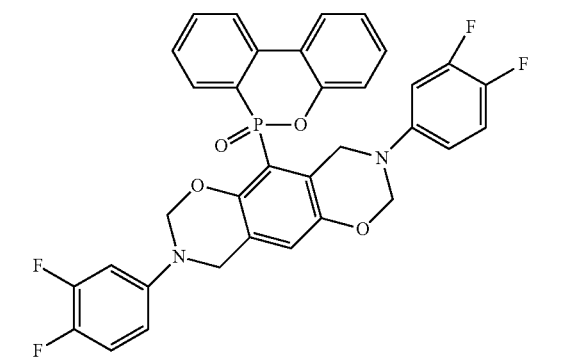
[Formula 101]
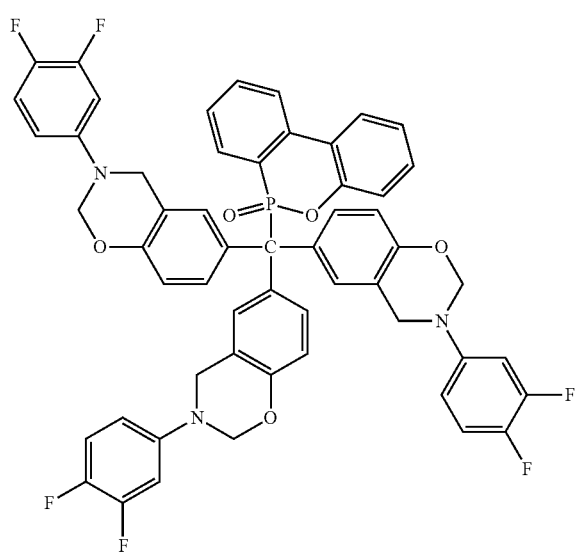
[Formula 102]
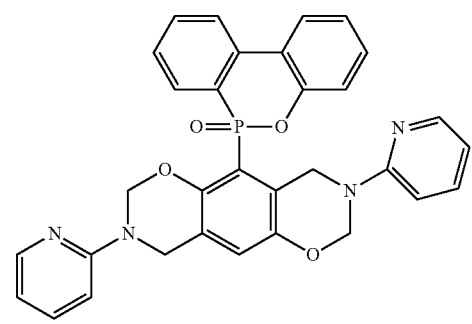
[Formula 103]
[Formula 104]
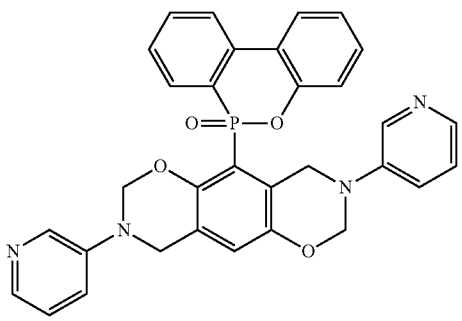
[Formula 105]
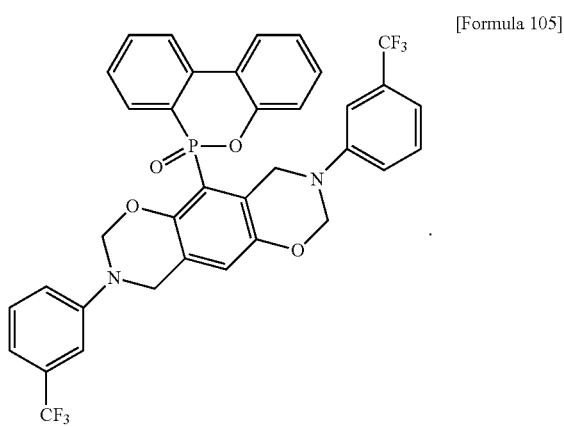
Examples of the compound represented by Formula 5 above are compounds represented by Formulae 106, 107, and 109 below:
[Formula 106]
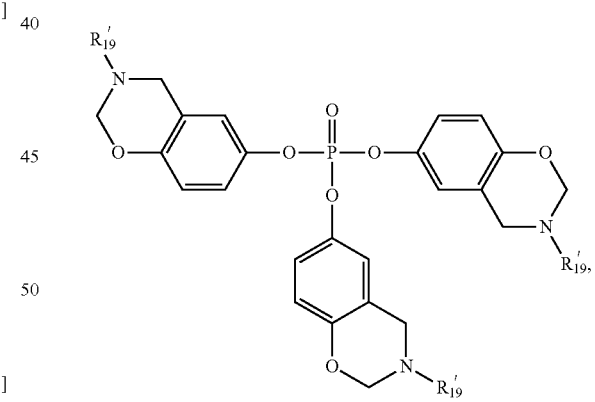
[Formula 107]
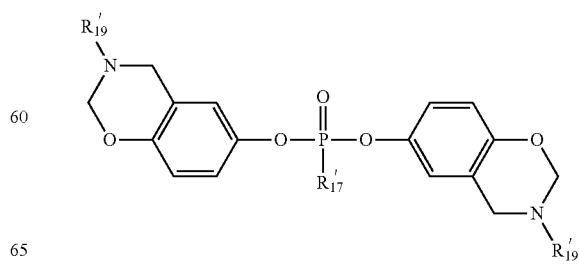

wherein in Formulae 106 and 107, $R_{17}'$ is a C1-C10 alkyl group, a C1-C10 alkoxy group, a C6-C10 aryl group, or a C6-C10 aryloxy group, and $R_{19}'$ is one group selected from groups having the structures illustrated in Formula 108:

[Formula 108]

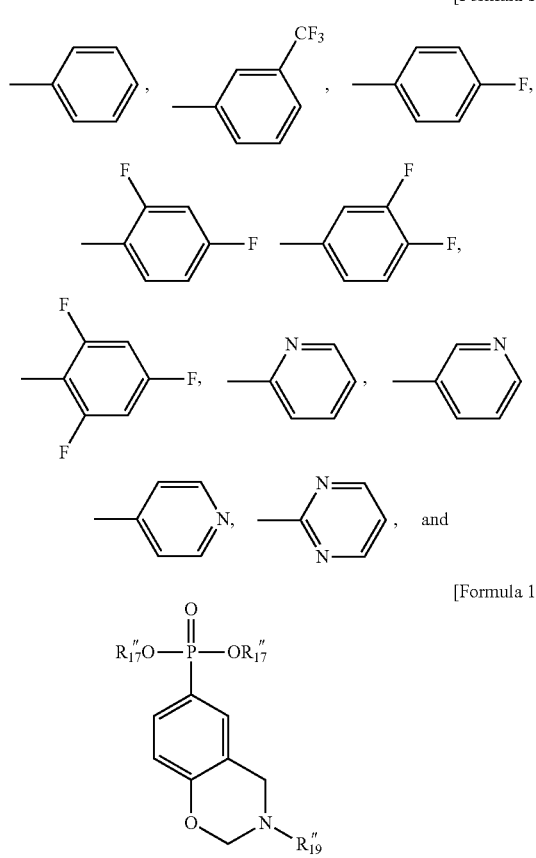

[Formula 109]

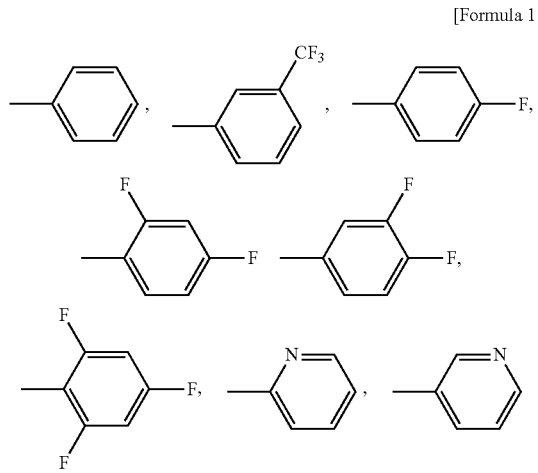

wherein in Formula 109, $R_{17}''$ is a C6-C10 aryl group, and $R_{19}''$ is one group selected from groups having the structures illustrated in Formula 110 below:

[Formula 110]

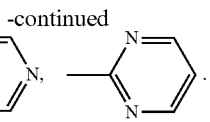

The compound represented by Formula 5 above may be compounds represented by Formulae 111 or 112:

[Formula 111]

[Formula 112]

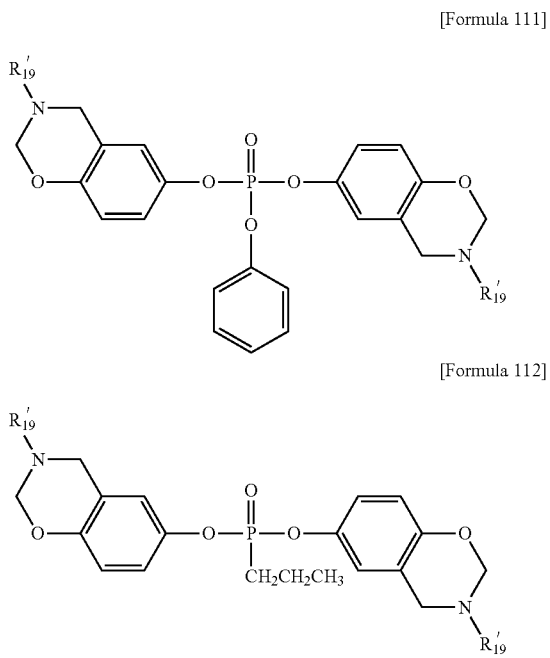

wherein in Formulae 111 and 112, $R_{19}'$ is one group selected from groups having the structures illustrated in Formula 111A below:

[Formula 111A]

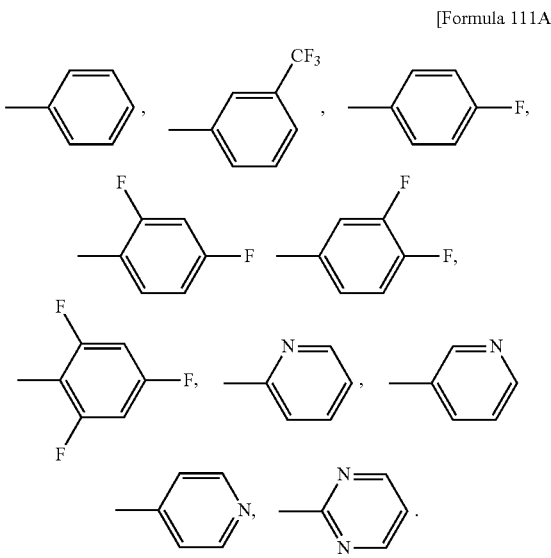

Examples of the compound represented by Formula 5 above are compounds represented by Formulae 113 to 117, 117A, and 118:

[Formula 113]
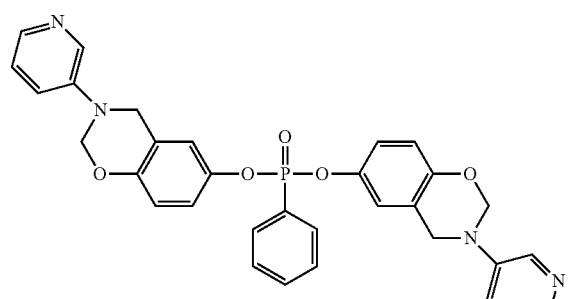
[Formula 117]
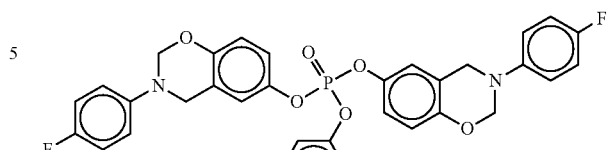
[Formula 117A]
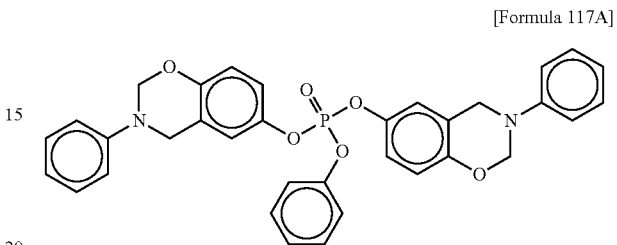
[Formula 114]
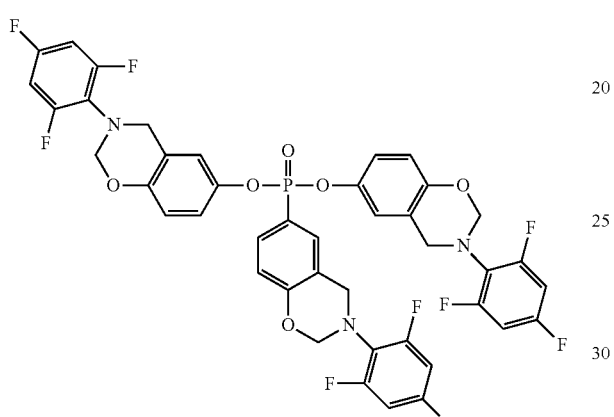
[Formula 118]
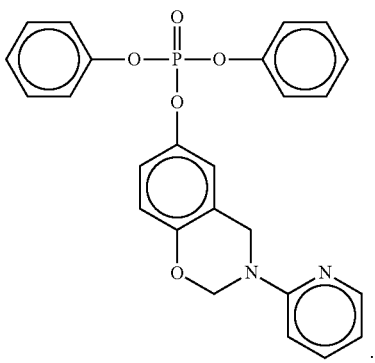
[Formula 115]
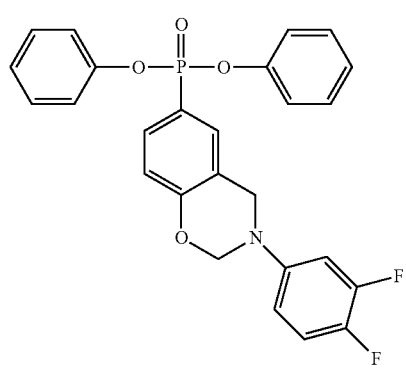
Examples of the compound represented by Formula 6 above are compounds represented by Formulae 119 to 121 below:
[Formula 119]
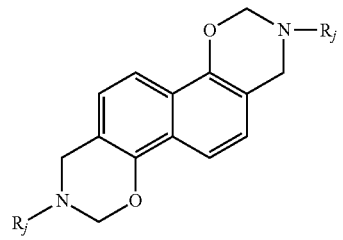
[Formula 116]
[Formula 120]
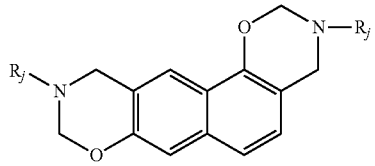
[Formula 121]
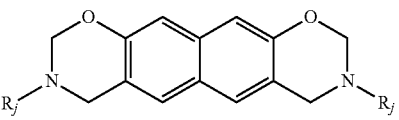

wherein in Formulae 119 to 121, $R_j$ is one group selected from groups having the structures illustrated in Formula 121A below:

[Formula 121A]

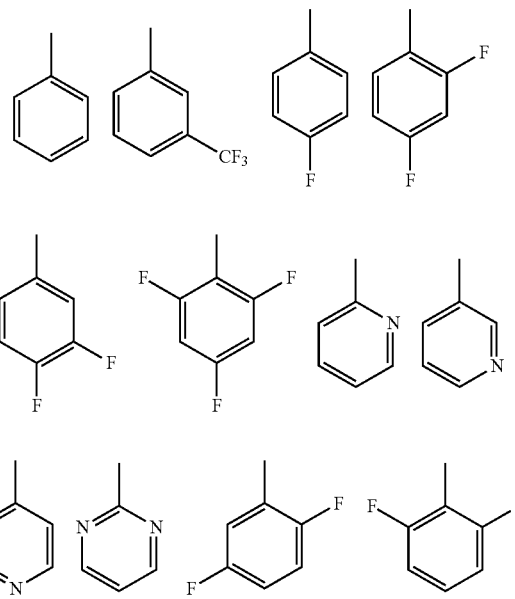

Detailed examples of the compound represented by Formula 6 above are compounds represented by Formulae 122 to 129 below:

[Formula 122]

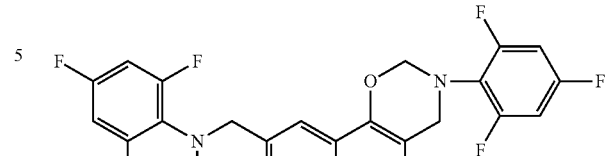

[Formula 123]

[Formula 124]

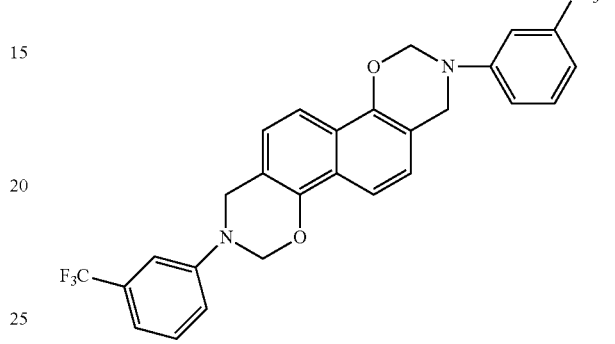

[Formula 125]

[Formula 126]

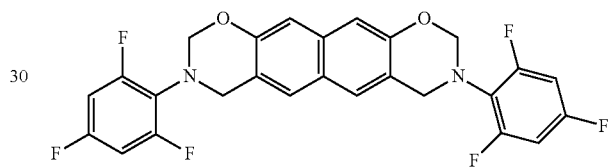

[Formula 127]

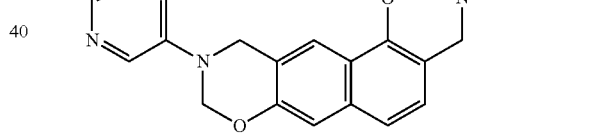

[Formula 128]

[Formula 129]

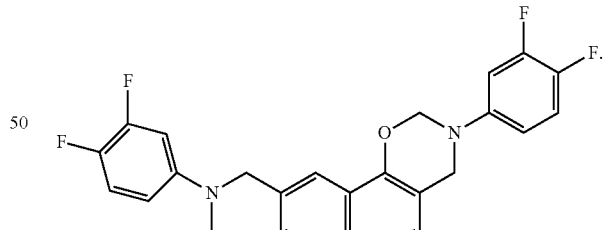

The composition including at least one compound selected from the group consisting of a compound represented by Formula 1 and/or Formula 2 may further include a cross-linkable compound.

The cross-linkable compound may be any one of various compounds that have a functional group that is cross-linkable to the at least one compound selected from the group consisting of the compound represented by Formula 1 and/or Formula 2. For example, the cross-linkable compound may be any one of various aromatic compounds that contain nitrogen, such as a five-membered nitrogen-containing aromatic ring compound, or a six-membered nitrogen-containing aromatic ring compound.

The cross-linkable compound may include at least one polymer selected from the group consisting of a polyazole-based material, polyoxazole, polypyrimidine, polyimide, polyimidazole, polybenzothiazole, polybenzoxazole, polyoxadiazole, polyquinoxaline, polythiadiazole, polypyridine, and polytetraazapyrene. When a polyazole-based material is used as the cross-linkable compound, a final product may be a graft polymer produced by graft-polymerizing the at least one compound selected from the group consisting of the compound represented by Formula 1 and/or Formula 2 with a polyazole-based material.

The term "a polymerization product of a composite including the at least one compound selected from the group consisting of the compound represented by Formula 1 and/or Formula 2; and a polyazole-based material" is used herein as having the structure as described above.

The polyazole-based material refers to a polymer having a repeating unit that includes at least one aryl ring containing at least one nitrogen atom. The aryl ring may have such a structure that a 5-membered ring or 6-membered ring that has 1 to 3 nitrogen atoms is fused with other rings, for example, other aryl rings or a heteroaryl ring. In this case, the nitrogen atoms may be substituted with an oxygen atom, a phosphorus atom, and/or a sulfur atom. Examples of the aryl ring are phenyl, naphthyl, hexahydroindyl, indanyl, and tetrahydronaphthyl. The polyazole-based material has at least one amino group in its repeating unit. In this case, an amino group may be a part of an aryl ring or a part of a substituent of the aryl unit, existing as a primary amino group, a secondary amino group, or a tertiary amino group.

The term "amino group" refers to a group in which a nitrogen atom is covalently bonded to at least one carbon atom or hetero atom. An amino group includes, for example, —$NH_2$ and substituted moieties.

The term "alkylamino group" includes alkylamino in which nitrogen is bonded to at least one additional alkyl group, and "arylamino" and "diarylamino" in which nitrogen is bonded to independently selected at least one, or two or more, aryl groups.

The polyazole-based material and a method of manufacturing a polymer film including the same are disclosed in US 2005/0256296. According to an embodiment of the present invention, the polyazole-based material may have at least one monomer selected from azole units represented by Formulae 130 to 143 below:

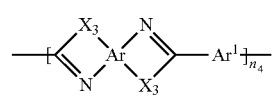

[Formula 130]

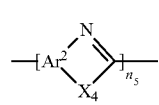

[Formula 131]

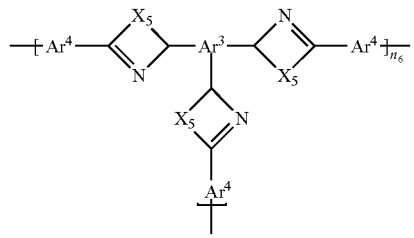

[Formula 132]

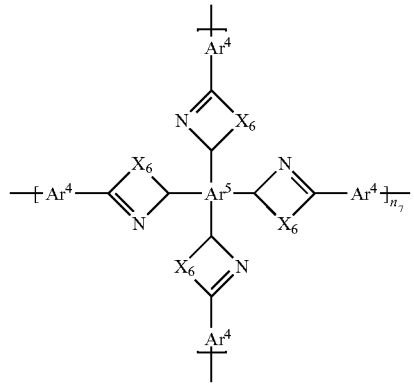

[Formula 133]

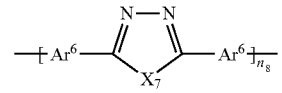

[Formula 134]

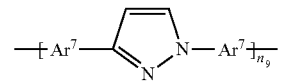

[Formula 135]

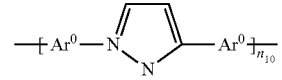

[Formula 136]

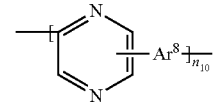

[Formula 137]

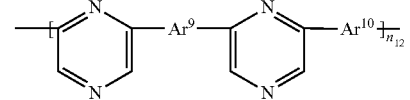

[Formula 138]

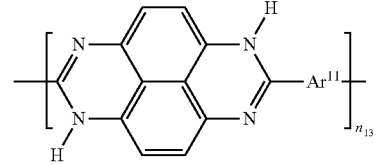

[Formula 139]

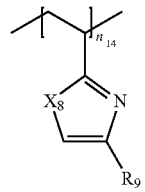

[Formula 140]

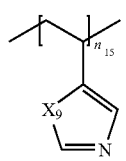

[Formula 141]

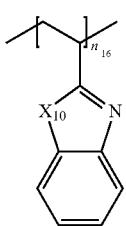

[Formula 142]

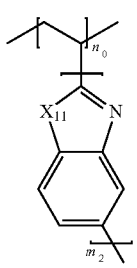

[Formula 143]

wherein in Formulae 130 to 143, $Ar^0$ may be identical to or different from another $Ar^0$, or any other $Ar^n$ (where n can be no superscript or 0 to 11), and may each be a 2-valent monocyclic or polycyclic C6-C20 aryl group or C2-C20 heteroaryl group, Ar may be identical to or different from another Ar, or any other $Ar^n$ (where n can be no superscript or 0 to 11), and may each be a 4-valent monocyclic or polycyclic C6-C20 aryl group or C2-C20 heteroaryl group, $Ar^1$ may be identical to or different from another $Ar^1$, or any other $Ar^n$ (where n can be no superscript or 0 to 11), and may each be a 2-valent monocyclic or polycyclic C6-C20 aryl group or C2-C20 heteroaryl group, $Ar^1$ may be identical to or different from another $Ar^2$, or any other $Ar^n$ (where n can be no superscript or 0 to 11), and may each be a 2-valent or 3-valent monocyclic or polycyclic C6-C20 aryl group or C2-C20 heteroaryl group, $Ar^3$ may be identical to or different from another $Ar^3$, or any other $Ar^n$ (where n can be no superscript or 0 to 11), and may each be a 3-valent monocyclic or polycyclic C6-C20 aryl group or C2-C20 heteroaryl group, $Ar^4$ may be identical to or different from another $Ar^4$, or any other $Ar^n$ (where n can be no superscript or 0 to 11), and may each be a 3-valent monocyclic or polycyclic C6-C20 aryl group or C2-C20 heteroaryl group, $Ar^5$ may be identical to or different from another $Ar^5$, or any other $Ar^n$ (where n can be no superscript or 0 to 11), and may each be a 4-valent monocyclic or polycyclic C6-C20 aryl group or C2-C20 heteroaryl group, $Ar^6$ may be identical to or different from another $Ar^6$, or any other $Ar^n$ (where n can be no superscript or 0 to 11), and may each be a 2-valent monocyclic or polycyclic C6-C20 aryl group or C2-C20 heteroaryl group, $Ar^7$ may be identical to or different from another $Ar^7$, or any other $Ar^n$ (where n can be no superscript or 0 to 11), and may each be a 2-valent monocyclic or polycyclic C6-C20 aryl group or C2-C20 heteroaryl group, $Ar^8$ may be identical to or different from another $Ar^8$, or any other $Ar^n$ (where n can be no superscript or 0 to 11), and may each be a 3-valent monocyclic or polycyclic C6-C20 aryl group or C2-C20 heteroaryl group, $Ar^9$ may be identical to or different from another $Ar^9$, or any other $Ar^n$ (where n can be no superscript or 0 to 11), and may each be a 2-valent, 3-valent, or 4-valent monocyclic or polycyclic C6-C20 aryl group or C2-C20 heteroaryl group, $Ar^{10}$ may be identical to or different from another $Ar^{10}$, or any other $Ar^n$ (where n can be no superscript or 0 to 11), and may each be a 2-valent or 3-valent monocyclic or polycyclic C6-C20 aryl group or C2-C20 heteroaryl group, $Ar^{11}$ may be identical to or different from another $Ar^{11}$, or any other $Ar^n$ (where n can be no superscript or 0 to 11), and may each be a 2-valent monocyclic or polycyclic C6-C20 aryl group or C2-C20 heteroaryl group, $X_3$ to $X_{11}$ may be identical to or different from each other, and may be oxygen, sulfur, or —N(R') where R' is hydrogen, a C1-C20 alkyl group, a C1-C20 alkoxy group, or a C6-C20 aryl group, $R_9$ may be identical to or different from each other, and may be hydrogen, a C1-C20 alkyl group, or a C6-C20 aryl group, and $n_0$, $n_4$ to $n_{16}$ and $m_2$ are each independently an integer of 10 or more, for example, an integer of 100 or more, for example, 100 to 100,000.

Examples of the aryl or heteroaryl group are benzene, naphthalene, biphenyl, diphenylether, diphenylmethane, diphenyldimethylmethane, bisphenone, diphenylsulfone, quinoline, pyridine, bipyridine, pyridazine, pyrimidine, pyrazine, triazine, tetrazine, pyrrole, anthracene, benzopyrrole, benzotriazole, benzoxathiazole, benzoxadiazole, benzopyridine, benzopyradine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, acridizine, phenanthroline, and phenanthrene, and these materials may have a substituent.

$Ar^1$, $Ar^4$, $Ar^6$, $Ar^7$, $Ar^8$, $Ar^9$, $Ar^{10}$, and $Ar^{11}$ may all have any possible substitution pattern. For example, in the case of phenylene, for example, $Ar^1$, $Ar^4$, $Ar^6$, $Ar^7$, $Ar^6$, $Ar^9$, $Ar^{10}$ and $Ar^{11}$ may each be an orthophenylene, methaphenylene or paraphenylene.

Examples of the alkyl group are monocyclic C1-C4 alkyl groups, such as methyl, ethyl, n-propyl, i-propyl, or t-butyl, and examples of the aryl group are phenyl and naphthyl.

The substituent may be a halogen atom such as fluorine, an amino group, a hydroxy group, or a monocyclic alkyl group, such as methyl or ethyl.

Examples of the polyazole-based material are polyoxazole, polypyrimidine, polyimide, polyimidazole, polybenzothiazole, polybenzoxazole, polyoxadiazole, polyquinoxaline, polythiadiazole, polypyridine, polypyrimidine, and polytetraazapyrene.

The polyazole-based material may be a copolymer or blend including at least two units selected from the compounds represented by Formulae 21 to 34. The polyazole-based material may be a block copolymer (diblock or triblock), a random copolymer, a periodic copolymer, or an alternating polymer, each of which includes least two units selected from the compounds represented by Formulae 130 to 143.

According to an embodiment of the present invention, the polyazole-based material may be a polyazole-based material including a unit represented by Formula 130 and/or 131.

The polyazole-based material may include at least one polymer selected from the group consisting of polymers represented by Formulae 144 to 170 below:

[Formula 144]
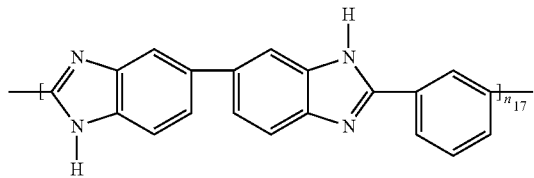
[Formula 145]
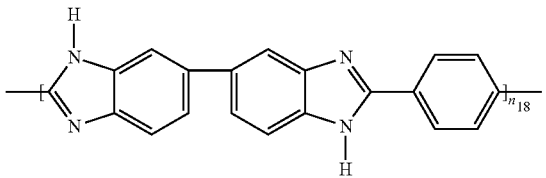
[Formula 146]
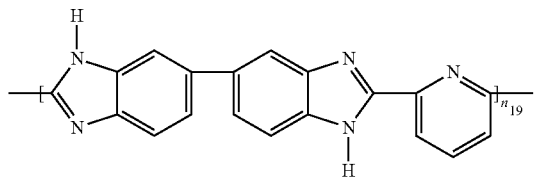
[Formula 147]
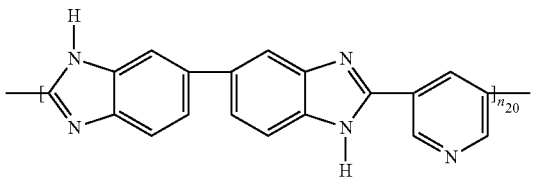
[Formula 148]
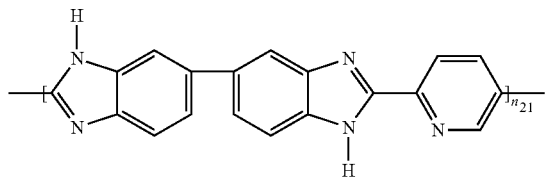
[Formula 149]
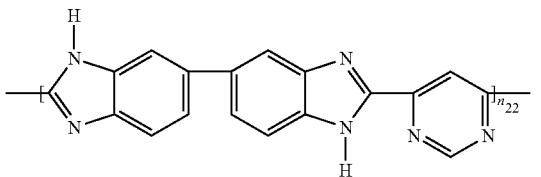
[Formula 150]
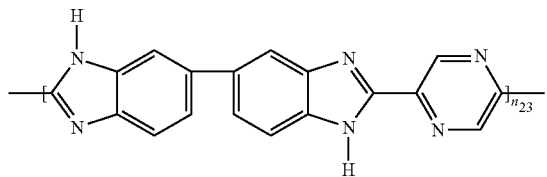
[Formula 151]
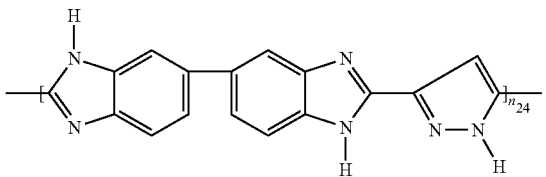
[Formula 152]
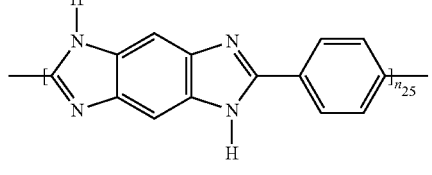
[Formula 153]
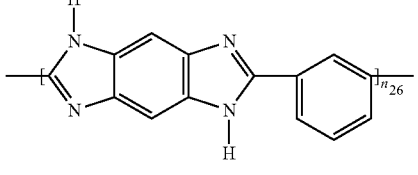
[Formula 154]
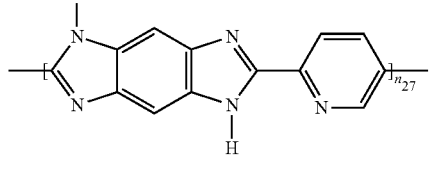
[Formula 155]
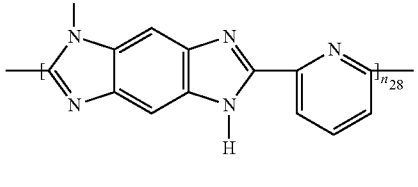
[Formula 156]
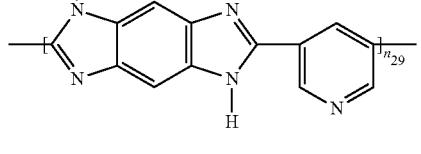
[Formula 157]
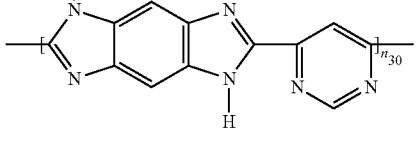
[Formula 158]
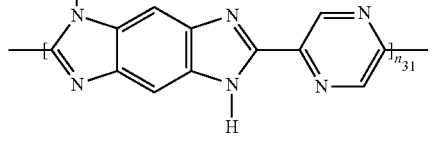
[Formula 159]

[Formula 160]
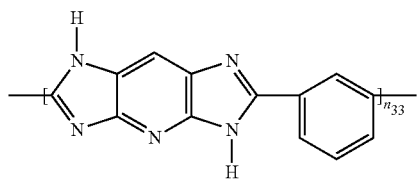
[Formula 161]
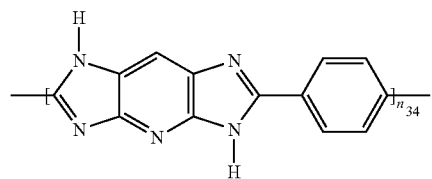
[Formula 162]
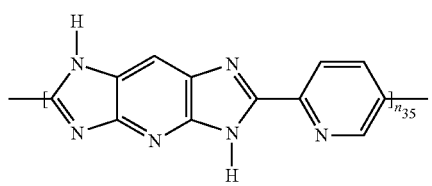
[Formula 163]
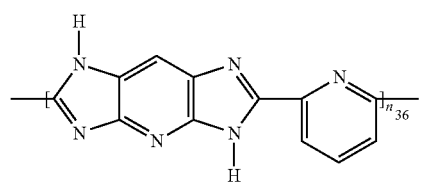
[Formula 164]
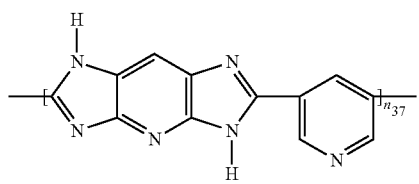
[Formula 165]
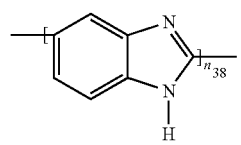
[Formula 166]
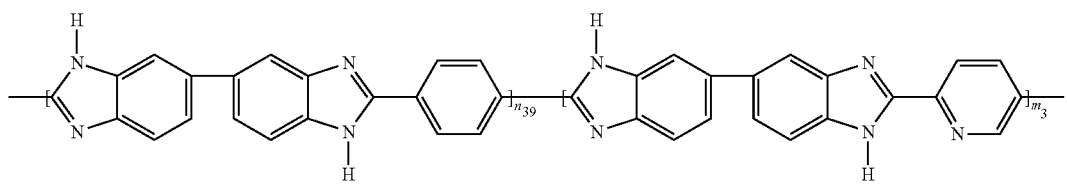
[Formula 167]
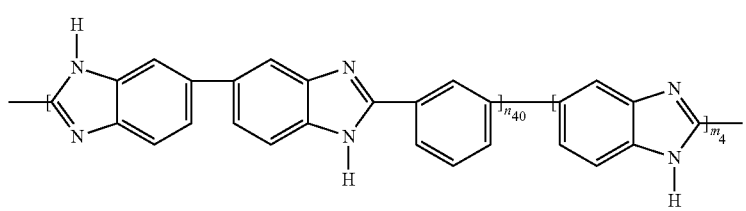
[Formula 168]
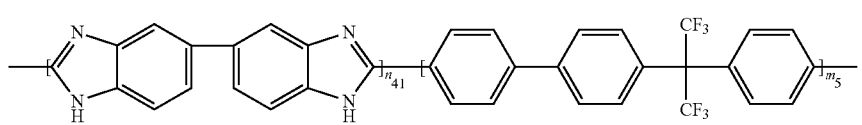
[Formula 169]
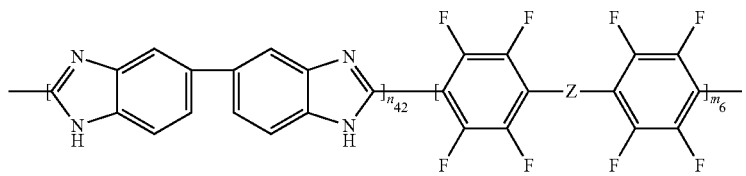
[Formula 170]
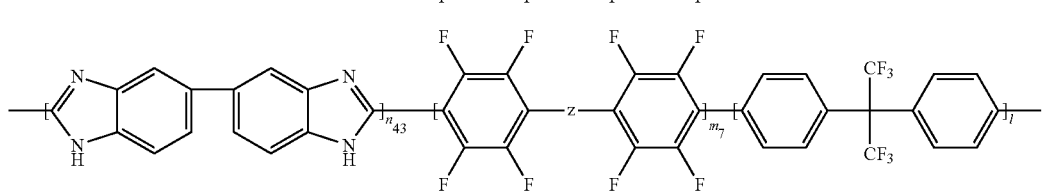
wherein in Formula 144 to Formula 170, I, $n_{17}$ to $n_{43}$ and $m_3$ to $m_7$ each are an integer of 10 or more, for example, an integer of 100 or more,
z represents a chemical bond, or —$(CH_2)_s$—, —C(=O)—, —$SO_2$—, —$C(CH_3)_2$—, or —$C(CF_3)_2$—, and s is an integer of about 1 to about 5.

The polyazole-based material may be a compound incorporating m-PBI and represented by Formula 10 below or a compound incorporating p-PBI and represented by Formula 11 below:

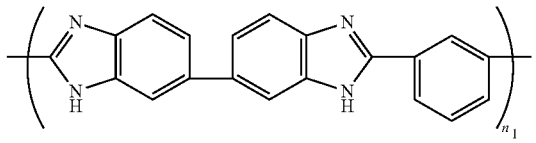

[Formula 10]

wherein in Formula 10, $n_1$ is an integer of 10 or more, and

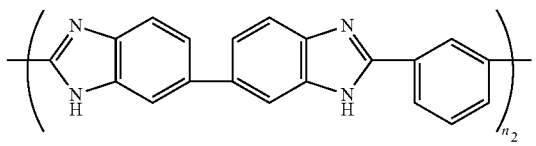

[Formula 11]

wherein in Formula 11, $n_2$ is an integer of 10 or more.

A number average molecular weight of the polymer represented by Formula 10 or 11 may be 1,000,000 or less.

The polyazole-based material may be a benzimidazole-based polymer represented by Formula 12 below:

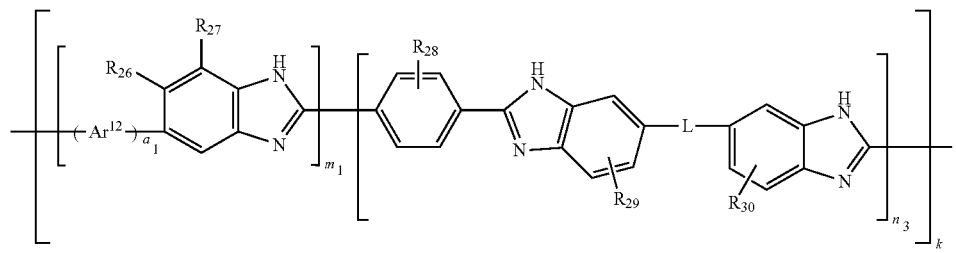

[Formula 12]

wherein in Formula 12, $R_{26}$ and $R_{27}$ are each independently hydrogen, a substituted or unsubstituted C1-C20 alkyl group, a substituted or unsubstituted C1-C20 alkoxy group, a substituted or unsubstituted C6-C20 aryl group, a substituted or unsubstituted C6-C20 aryloxy group, a substituted or unsubstituted C3-C20 heteroaryl group, or a substituted or unsubstituted C3-C20 heteroaryloxy group, or $R_{26}$ and $R_{27}$ may be connected to form a C4-C20 carbocycle or a C3-C20 heterocycle, $Ar^{12}$ is a substituted or unsubstituted C6-C20 arylene group or a substituted or unsubstituted C3-C20 heteroarylene group, $R_{28}$ to $R_{30}$ each represent a mono-substituted or poly-substituted substituent, and may each be independently hydrogen, a substituted or unsubstituted C1-C20 alkyl group, a substituted or unsubstituted C1-C20 alkoxy group, a substituted or unsubstituted C6-C20 aryl group, a substituted or unsubstituted C6-C20 aryloxy group, a substituted or unsubstituted C3-C20 heteroaryl group, or a substituted or unsubstituted C3-C20 heteroaryloxy group, L represents a linker, $m_1$ is a number from about 0.01 to about 1, $a_1$ is about 0 or about 1, $n_3$ is a number from about 0 to about 0.99, and k is a number from about 10 to about 250.

The benzimidazole-based polymer may be a compound represented by Formula 171 or 172 below:

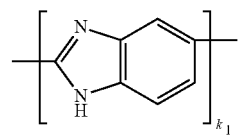

[Formula 171]

wherein in Formula 171, $k_1$ is a degree of polymerization and may be a number from about 10 to about 300, and

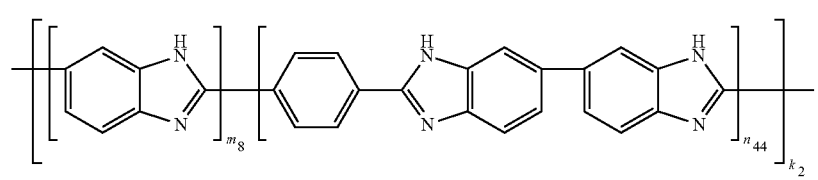

[Formula 172]

wherein in Formula 172, $m_8$ may be a number from about 0.01 to about 1, and for example, about 1 or a number from 0.1 to about 0.9, $n_{44}$ may be a number from about 0 to about 0.99, for example, about a number from 0 or 0.1 to about 0.9, and $K_2$ is a number from about 10 to about 250.

When the at least one compound selected from the group consisting of the compound represented by Formula 1 and/or Formula 2 is reacted with the polyazole-based material, the amount of the cross-linkable compound may range from about 5 to about 210 parts by weight, for example, about 40 to about 210 parts by weight, based on 100 parts by weight of the at least one compound selected from the group consisting of the compound represented by Formula 1 and/or Formula 2. If the amount of the cross-linkable compound is within the range as described above, excellent proton-conducting characteristics of the polymers may be obtained.

Hereinafter, a method of manufacturing an electrolytic membrane by using a composition including a crystalline organic and inorganic porous composite and at least one compound selected from the group consisting of the compound represented by Formula 1 and/or Formula 2 will be described in detail.

A crystalline organic and inorganic porous composite, at least one compound selected from the group consisting of the compound represented by Formula 1 and/or Formula 2, and a solvent are mixed to prepare a composition for forming the electrolytic membrane.

The composition for forming the electrolytic membrane may further include a cross-linkable compound.

The solvent may be added when the crystalline organic and inorganic porous composite is mixed with the at least one compound selected from the group consisting of the compound represented by Formula 1 and/or Formula 2. Alternatively, each of the crystalline organic and inorganic porous composite and the at least one compound selected from the group consisting of the compound represented by Formula 1 and/or Formula 2 is dissolved or dispersed in the solvent and then the result is mixed together.

The mixture is stirred at a temperature of about 0 to about 150° C., for example, about 70 to about 95° C., for about 5 to about 15 hours, for example, about 8 to about 12 hours.

The resultant mixture is cast on a substrate and then heat treated. The substrate may be a support, a glass substrate, or a polyester film (for example, MYLAR® by the DuPont Corp).

The heat treatment temperature may be from about 100 to about 300° C. The heat treated product is cooled to room temperature (20-25° C.), and then the electrolytic membrane in a film form is separated from the substrate and dried under a vacuum condition, thereby manufacturing an electrolytic membrane for a fuel cell.

The electrolytic membrane may be further impregnated with a proton conductor. Examples of the proton conductor are a polyphosphoric acid, phosphonic acid ($H_3PO_3$), orthophosphoric acid ($H_3PO_4$), pyrophosphoric acid ($H_4P_2O_7$), triphosphoric acid ($H_3P_3O_{10}$), metaphosphoric acid, a C1-C20 organic phosphonic acid, and derivatives thereof.

The concentration of the proton conductor is, for example, about 80 to about 98 weight (wt.) %, for example, about 80 wt. %, about 90 wt. %, about 95 wt. %, or about 98 wt. %. Examples of the C1-$C_{20}$ organic phosphonic acid are methyl phosphonic acid or ethyl phosphonic acid.

The separating of the electrolytic membrane film from the substrate may not be particularly limited. For example, the electrolytic membrane film is separated from the substrate, such as a glass substrate, by dipping the electrolytic membrane film in hot water for about 1 hour.

An electrode including a composition including a crystalline organic and inorganic porous composite and at least one compound selected from the group consisting of the compound represented by Formula 1 and/or Formula 2, according to an embodiment of the present invention, and a method of manufacturing the electrode will now be described in detail.

A catalyst, a crystalline organic and inorganic porous composite, at least one compound selected from the group consisting of the compound represented by Formula 1 and/or Formula 2, and a solvent are mixed to prepare a composition for forming an electrode catalyst layer.

The solvent may be N-methylpyrrolidone (NMP), dimethylacetamide (DMAc), etc. The amount of the solvent may be from about 1 to about 500 parts by weight based on 1 part by weight of the catalyst.

The composition for forming an electrode catalyst layer may further include a cross-linkable compound.

The solvent may be added when the crystalline organic and inorganic porous composite is mixed with the at least one compound selected from the group consisting of the compound represented by Formula 1 and/or Formula 2. Alternatively, each of the crystalline organic and inorganic porous composite and the at least one compound selected from the group consisting of the compound represented by Formula 1 and/or Formula 2 is dissolved or dispersed in the solvent and then the resultant is mixed together.

The composition for forming an electrode catalyst layer is coated on a carbon support to form an electrode having an electrode catalyst layer, thereby completing manufacture of the electrode. The carbon support may be fixed on a glass substrate so as to easily perform a coating process. The coating method may not be particularly limited, and may be coating using a doctor blade, bar-coating, or screen-printing.

After the coating of the composition for forming an electrode catalyst layer is performed, the coating product is dried at a temperature of about 20 to about 150° C. to remove the solvent used. The drying time may differ according to the drying temperature, and may be from about 10 to about 60 minutes. After the coating and drying of the composition, if needed, the composition may be heat-treated at a temperature of about 50 to about 250° C.

Also, the electrode may further include at least one proton conductor selected from the group consisting of polyphosphoric acid, phosphonic acid ($H_3PO_3$), orthophosphoric acid ($H_3PO_4$), pyrophosphoric acid ($H_4P_2O_7$), triphosphoric acid ($H_5P_3O_{10}$), metaphosphoric acid, a C1-C20 organic phosphonic acid, and derivatives thereof. In this case, the amount of the proton conductor may be from about 10 to about 1000 parts by weight based on 100 parts by weight of the total weight of the electrode.

The concentration of the proton conductor is not particularly limited. Examples of the C1-C20 organic phosphonic acid are methyl phosphonic acid or ethyl phosphonic acid. For example, if a phosphoric acid is used, an 85 wt. % phosphoric acid aqueous solution is used, and the impregnation time of the phosphoric acid may be from about 2.5 hours to about 14 hours at a temperature of 80° C. Examples of the C1-C20 organic phosphonic acid are methyl phosphonic acid, ethyl phosphonic acid, etc.

The electrode may further include any one of various binders that are conventionally used in manufacturing a fuel cell. The catalyst may be platinum (Pt) alone, an alloy or mixture of platinum and at least one metal selected from the group consisting of gold, palladium, rhodium, iridium, ruthenium, tin, molybdenum, cobalt, and chromium, or the Pt, or alloy or mixture, supported by a carbonaceous support. For example, the catalyst may include at least one catalyst metal selected from the group consisting of platinum (Pt), platinum cobalt (PtCo), and platinum ruthenium (PtRu), or may be a supported catalyst in which the catalyst metal is supported by a carbonaceous support.

The binder may include at least one polymer selected from the group consisting of poly(vinylidenefluoride), polytetrafluoroethylene, and a tetrafluoroethylene-hexafluoroethylene copolymer, and the amount of the binder is from about 0.001 to about 0.5 parts by weight, based on 1 part by weight of the catalyst. If the amount of the binder is within the range as described above, the binding force of the catalyst layer to the support may be sufficiently high.

A method of manufacturing a fuel cell by using an electrolytic membrane for a fuel cell according to an embodiment of the present invention will now be described in detail. An electrode for a fuel cell includes a catalyst layer including a catalyst and a binder. In this regard, kinds and amounts of the catalyst and the binder are the same as described above. An electrolytic membrane according to an embodiment of the present invention is interposed between two of the electrodes to manufacture a fuel cell.

Also, instead of the electrode as described above, an electrode including a composition including a crystalline organic and inorganic porous composite and at least one compound selected from the group consisting of compounds represented by Formulae 1 through 6 below according to an embodiment of the present invention, or a polymer as a polymerization product of the composition may be used.

Hereinafter, a method of manufacturing a fuel cell by using an electrode for a fuel cell according to an embodiment of the present invention will be described in detail. An electrode for a fuel cell according to an embodiment of the present invention is disposed on each side of an electrolytic membrane, and then, the electrodes are coupled to the electrolytic membrane to manufacture a fuel cell.

The electrolytic membrane may be any one of various electrolytic membranes that are conventionally used in a fuel cell. Examples of the electrolytic membrane are a polybenzimidazole electrolytic membrane, a polybenzoxazine-polybenzimidazole copolymer electrolytic membrane, and a polytetrafluoroethylene (PTFE) porous membrane. Also, the electrolytic membranes including the polymerization product of a composition including at least one compound selected from the group consisting of compounds represented by Formulae 1 through 6 as described above may also be used as the electrolytic membrane herein. The composition further includes the cross-linkable compound.

A fuel cell according to an embodiment of the present invention includes an electrolytic membrane that has high conductivity, excellent tensile strength characteristics, and excellent processibility, such as dimensional stability, due to a high phosphoric acid retention amount and prevention of leakage of a phosphoric acid and, due to the inclusion of the electrolytic membrane therein, cell voltage characteristics of the fuel cell are improved. The fuel cell exhibits excellent cell performances at high temperature, for example, 100° C. or higher, under non-humidified conditions.

Substituents in the formulae above may be defined as follows.

As used herein, the term "alkyl" refers to a fully saturated branched or unbranched (or straight chain or linear) hydrocarbon moiety. Examples of the alkyl group used herein include, but are not limited to, methyl, ethyl, n-propyl, iso-propyl, n-butyl, iso-butyl, sec-butyl, n-pentyl, isopentyl, neo-pentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a $C_1$-$C_{20}$ alkyl group substituted with a halogen atom (for example, $CCF_3$, $CHCF_2$, $CH_2F$ and $CCl_3$), a $C_1$-$C_{20}$ alkoxy group, a $C_2$-$C_{20}$ alkoxyalkyl group, a hydroxy group, a nitro group, a cyano group, an amino group, an amidino group, hydrazine, a hydrazone, a carboxyl group or salt thereof, a sulfonyl group, a sulfamoyl group, a sulfonic acid group or salt thereof, a phosphoric acid or salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

As used herein, the term "halogen atom" refers to fluoro, bromo, chloro, or iodo. As used herein, the term "a $C_1$-$C_{20}$ alkyl group substituted with a halogen atom" refers to a $C_1$-$C_{20}$ alkyl group that is substituted with one or more halo groups, and unlimited examples of a C1-C20 alkyl group that is substituted with one or more halo groups are monohaloalkyl, dihaloalkyl, and polyhaloalkyl including perhaloalkyl. A monohaloalkyl has one iodo, bromo, chloro or fluoro within the alkyl group, and dihaloalky and polyhaloalkyl groups have two or more of the same halo atoms or a combination of different halo groups within the alkyl group.

As used herein, the term "alkoxy" refers to alkyl-O—, wherein alkyl is defined herein above. Nonlimiting examples of alkoxy are methoxy, ethoxy, propoxy, 2-propoxy, butoxy, tert-butoxy, pentyloxy, hexyloxy, cyclopropyloxy, and cyclohexyloxy. At least one hydrogen atom of the alkoxy group may be substituted with the same substituent as described above with respect to the alkyl group.

The term "alkoxyalkyl" refers to an alkyl group, as defined above, in which the alkyl group is substituted with alkoxy. At least one hydrogen atom of the alkoxyalkyl group may be substituted with the same substituent as described above with respect to the alkyl group. The term alkoxyalkyl includes a substituted alkoxyalkyl moiety.

The term "alkenyl" refers to a branched or unbranched hydrocarbon having at least one carbon-carbon double bond. Examples of alkenyl are, but are not limited to, vinyl, allyl, butenyl, isopropenyl, and isobutenyl. At least one hydrogen atom of the alkenyl group may be substituted with the same substituent as described above with respect to the alkyl group.

The term "alkynyl" refers to a branched or unbranched hydrocarbon having at least one carbon-carbon triple bond. Examples of alkynyl are, but are not limited to, ethynyl, butynyl, isobutynyl, and isopropynyl. At least one hydrogen atom of alkynyl may be substituted with the same substituent as described above with respect to the alkyl group.

The term "aryl" is used alone or in combination, and refers to an aromatic hydrocarbon group having one or more rings. The term "aryl" also refers to a group in which an aromatic ring is fused to one or more cycloalkyl rings. Examples of aryl are, but are not limited to, phenyl, naphthyl, or tetrahydronaphthyl. At least one hydrogen atom of the aryl may be substituted with the same substituent as described above with respect to the alkyl group.

The term "arylalkyl" refers to an alkyl substituted with aryl. Examples of arylalkyl are benzyl or phenyl-$CH_2CH_2$—.

The term "aryloxy" includes —O-aryl, wherein aryl is defined herein. A nonlimiting example of aryloxy is phenoxy. At least one hydrogen atom of aryloxy may be substituted with the same substituent as described above with respect to the alkyl group.

The term "heteroaryl" refers to a monocyclic or bicyclic organic compound that contains one or more hetero atoms selected from N, O, P, and S, and the remaining ring atoms are carbon atoms. The heteroaryl may include, for example, 1 to 5 hetero atoms, and 5 to 10 ring members. S or N may be oxidized to various oxidation states.

Typical monocyclic heteroaryl groups include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin'4-yl, pyrazin-5-yl, 2-pyrimidin-2-yl, 4-pyrimidin-2-yl, and 5-pyrimidin-2-yl.

The term "heteroaryl" also refers to a group in which a heteroaromatic ring is fused to one or more aryl, cycloaliphatic, or heterocyclic rings. Examples of bicyclic heteroaryl are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinoxalinyl, phenanthridinyl, phenathrolinyl, phenazinyl, phenothiazinyl, phenoxazinyl, benzisoqinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxazinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl. At least one hydrogen atom in the heteroaryl group may be substituted with the same substituent as described above with respect to the alkyl group.

The term "heteroarylalkyl" refers to alkyl substituted with heteroaryl.

The term "heteroaryloxy" includes an —O-heteroaryl moiety. At least one hydrogen atom in heteroaryloxy may be substituted with the same substituent as described above with respect to the alkyl group.

The term "heteraryloxyalkyl" refers to an alkyl group that is substituted with heteroaryloxy. At least one hydrogen atom in heteraryloxyalkyl may be substituted with the same substituent as described above with respect to the alkyl group.

As used herein, the term "carbocyclic" refers to saturated or partially unsaturated but non-aromatic monocyclic, bicyclic or tricyclic hydrocarbon groups. Exemplary monocyclic hydrocarbon groups are cyclopentyl, cyclopentenyl, cyclohexyl and cyclohexenyl. Exemplary bicyclic hydrocarbon groups are bornyl, decahydronaphthyl, bicyclo[2.1.1]hexyl, bicyclo[2.2.1]heptyl, bicyclo[2.2.1]heptenyl, and bicyclo[2.2.2]octyl. An exemplary tricyclic hydrocarbon groups is adamantyl. At least one hydrogen atom in carbocyclic may be substituted with the same substituent as described above with respect to the alkyl group.

The term "heterocyclic" refers to a ring containing 5-10 ring atoms including a hetero atom such as N, S, P, or O, and an example of heterocyclic is pyridyl. At least one hydrogen atom in heterocyclic may be substituted with the same substituent as described above with respect to the alkyl group.

The term "heterocyclicoxy" includes an —O-heterocyclic, and at least one hydrogen atom in heterocyclicoxy may be substituted with the same substituent as described above with respect to the alkyl group.

The term "sulfonyl" includes R"—SO$_2$—, wherein R" is hydrogen, alkyl, aryl, heteroaryl, aryl-alkyl, heteroaryl-alkyl, alkoxy, aryloxy, cycloalkyl, or heterocyclic.

The term "sulfamoyl" includes H$_2$NS(O)$_2$—, alkyl-NHS(O)$_2$—, (alkyl)$_2$NS(O)$_2$—, aryl-NHS(O)$_2$—, alkyl(aryl)-NS(O)$_2$—, (aryl)$_2$NS(O)$_2$—, heteroaryl-NHS(O)$_2$—, (aryl-alkyl)-NHS(O)$_2$—, or (heteroaryl-alkyl)-NHS(O)$_2$—. At least one hydrogen atom in sulfamoyl may be substituted with the same substituent as described above with respect to the alkyl group.

The term "amino" refers to a group in which a nitrogen atom is covalently bonded to at least one carbon or heteroatom. The term "amino" includes, for example, —NH$_2$ and substituted moieties.

The term also includes "alkylamino" wherein nitrogen is bound to at least one additional alkyl group. The term also includes "arylamino" and "diarylamino" groups wherein the nitrogen is bound to at least one or two independently selected aryl groups, respectively.

The term "alkylene", "alkenylene", "alkynylene", "arylene", and "heteroarylene" are defined as described above, except that "alkyl", "alkenyl", "alkynyl", "aryl", and "heteroaryl", which are mono-valent groups, are divalent groups. At least one hydrogen atom in "alkylene", "alkenylene", "alkynylene", "arylene", and "heteroarylene" may be substituted with the same substituent as described above with respect to the alkyl group.

One or more embodiments will now be described in further detail with reference to the following examples. These examples are for illustrative purpose only and are not intended to limit the scope of the one or more embodiments.

Example 1

Manufacture of Electrolytic Membrane 1.18 g of compound (d-PPO-a) represented by Formula 117A below, 12.00 g of 10 wt. % PBI solution (in DMAc) represented by Formula 11 below, and 0.03 g of a compound represented by Formula 9 below were added to a 20 mL vial to prepare a mixture.

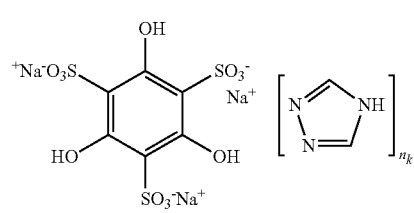

[Formula 9]

wherein in Formula 9, $n_k$ is about 0.3.

[Formula 117A]

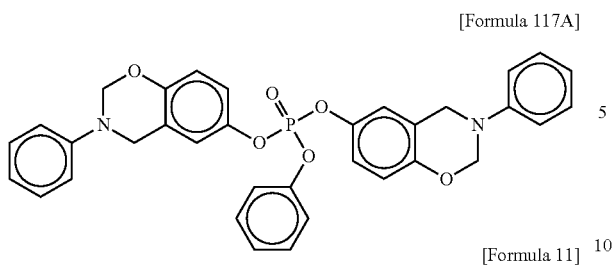

[Formula 11]

wherein in Formula 11, n₂ was about 30.

The mixture was stirred at a temperature of 80° C. for about 8 to 12 hours.

A predetermined amount of the resultant solution was cast on a glass plate to a thickness of 30 μm and the glass plate was placed in an oven. The temperature of the oven was slowly increased from about 25 to about 250° C. to harden the solution (about 10 hours). The temperature was then slowly decreased to room temperature in the oven.

The film formed on the glass plate was dipped in hot water for 1 hour and separated from the glass substrate. The film was taken out of the water, and water on the film was removed, and then the film was dried for 24 hours or more in a vacuum oven, thereby completing manufacture of an electrolytic membrane.

Example 2

Manufacture of Electrolytic Membrane

An electrolytic membrane was manufactured in the same manner as in Example 1, except that the amount of d-PPO-a represented by Formula 117 was 1.15 g and the amount of the compound represented by Formula 9 was 0.05 g.

Example 3

Manufacture of Electrode 0.65 g of a catalyst in which 50 wt. % PtCo was supported by carbon and 3.3 g of NMP as a solvent were added to a stirring container, and the mixture was stirred to prepare a slurry.

The mixture including the compound (d-PPO-a) represented by Formula 117A below, the PBI solution (in DMAc) represented by Formula 11 below, and the compound represented by Formula 9 below prepared in Example 1 was added to the slurry and the resultant mixture was stirred to prepare a slurry for forming a cathode catalyst layer.

[Formula 9]

wherein in Formula 9, $n_k$ is 0.3.

[Formula 117A]

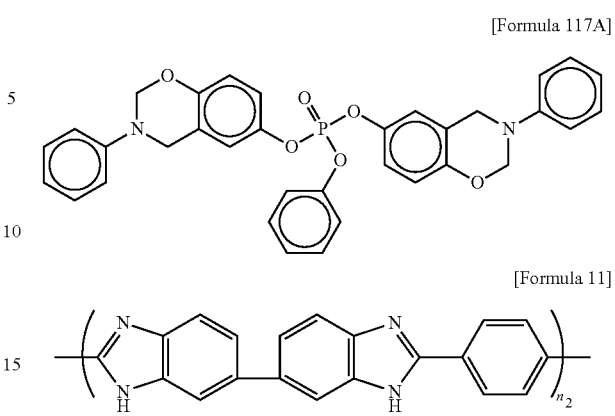

[Formula 11]

wherein in Formula 11, $n_2$ is about 30.

A sheet of carbon paper was cut to a size of 4×7 cm², and fixed on a glass plate, and coating was performed thereon by using a doctor blade (Sheen instrument). In this regard, the gap interval was adjusted to be 600 μm.

The slurry for forming a cathode catalyst layer was coated on the carbon paper, and dried at room temperature for 1 hour, at a temperature of 80° C. for 1 hour, at a temperature of 120° C. for 30 minutes, and at a temperature of 150° C. for 15 minutes so as to manufacture a cathode. The loading amount of Pt in the PtCo contained in the cathode was about 1.73 mg/cm².

An electrode manufactured as follows was used as an anode. 2 g of a catalyst in which 50 wt. % Pt was supported by carbon, and 9 g of NMP as a solvent were added to a stirring container, and the mixture was stirred using a high-speed stirrer for 2 minutes.

Subsequently, a solution prepared by dissolving 0.05 g of polyvinylidene fluoride in 1 g of NMP was added to the mixture and stirred for 2 minutes to prepare a slurry for forming an anode catalyst layer. The slurry was coated, by using a bar coater, on a sheet of carbon paper that had been coated with a microporous layer.

Separately, 60 parts by weight of a benzoxazine-based monomer represented by Formula 18 below, 3 parts by weight of a benzoxazine-based monomer represented by Formula 67 below, and 37 parts by weight of polybenzimidazole were blended, and then the blended product was hardened at a temperature of about 220° C.:

[Formula 18]

-continued

[Formula 67]

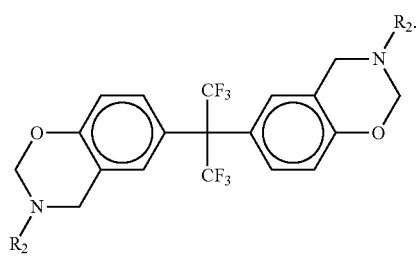

Then, the resultant product was impregnated with 85 wt. % phosphoric acid at a temperature of 80° C. for 4 hours or more to form an electrolytic membrane. In this regard, the amount of the phosphoric acid was about 480 parts by weight based on 100 parts by weight of the total weight of the electrolytic membrane.

The electrolytic membrane was interposed between the cathode and the anode to manufacture a membrane electrode assembly (MEA). In this regard, the cathode and the anode were used without impregnation with a phosphoric acid.

Passage of gas between the cathode and the anode was prevented by placing a polytetrafluoroethylene (PTFE) film having a thickness 200 μm as a main gasket and a PTFE film having a thickness of 20 μm as a sub gasket at each of an interface between the anode and the electrolytic membrane and an interface between the cathode and the electrolytic membrane. Controlled pressure was applied to the MEA by using a torque wrench, and the assembling was performed while the pressure was increased to 1, 2, and 3 N-m Torque in phases.

At a temperature of 150° C., under a condition in which the electrolytic membrane was not humidified, hydrogen (flow rate: 100 ccm) was supplied to the anode and air (250 ccm) was supplied to the cathode, thereby generating electricity, and battery characteristics were measured. In this case, since an electrolyte doped with a phosphoric acid was used, performance of the fuel cell increased over time. Accordingly, evaluation was performed after aging was performed until the driving voltage reached its maximum value. An area of each of the cathode and the anode was fixed to 2.8×2.8=7.84 cm$^2$, and the thickness of the cathode was about 430 μm and the thickness of the anode was about 390 μm.

Manufacturing Example 1

Manufacture of Fuel Cell 1 g of catalyst in which 50 wt. % PtCo was supported by carbon and 3 g of NMP as a solvent were added to a stirring container and the mixture was stirred to prepare a slurry. 5 wt. % polyvinylidenefluoride in NMP was added to the slurry until the amount of the polyvinylidenefluoride was 0.025 g and the resultant mixture was mixed for 10 minutes, thereby completing preparation of a slurry for forming a cathode catalyst layer.

A sheet of carbon paper was cut to a size of 4×7 cm$^2$ and fixed on a glass plate, and then coating was performed thereon by using a doctor blade (Sheen instrument). In this regard, the gap interval was adjusted to be 600 μm.

The slurry for forming a cathode catalyst layer was coated on the carbon paper, and dried at room temperature for 1 hour, at a temperature of 80° C. for 1 hour, at a temperature of 120° C. for 30 minutes, and at a temperature of 150° C. for 15 minutes so as to manufacture a cathode (fuel electrode). The loading amount of Pt in the PtCo contained in the cathode was about 3.0 mg/cm$^2$.

An electrode manufactured as follows was used as an anode. 2 g of a catalyst in which 50 wt. % Pt was supported by carbon, and 9 g of NMP as a solvent were added to a stirring container, and the mixture was stirred using a high-speed stirrer for 2 minutes.

Subsequently, a solution prepared by dissolving 0.05 g of polyvinylidene fluoride in 1 g of NMP was added to the mixture and stirred for 2 minutes to prepare a slurry for forming an anode catalyst layer. The slurry was coated, by using a bar coater on a sheet of carbon paper that had been coated with a microporous layer, thereby completing preparation of an anode. The loading amount of platinum of the anode was 1.4 mg/cm$^2$.

As described above, the loading amount of platinum (Pt) in the PtCo contained in the cathode was about 2.33 mg/cm$^2$ and the loading amount of platinum of the anode was 1.4 mg/cm$^2$.

The electrolytic membrane of Example 1 was interposed between the cathode and the anode to manufacture an MEA. In this case, the cathode and the anode were used without impregnation with a phosphoric acid.

Passage of gas between the cathode and the anode was prevented by placing a PTFE film having a thickness 200 μm as a main gasket and a PTFE film having a thickness of 20 μm as a sub gasket at each of an interface between the anode and the electrolytic membrane and an interface between the cathode and the electrolytic membrane. Controlled pressure was applied to the MEA by using a torque wrench, and the assembling was performed while the pressure was increased to 1, 2, and 3 N-m Torque in phases.

At a temperature of 150° C., under a condition in which the electrolytic membrane was not humidified, hydrogen (flow rate: 100 ccm) was supplied to the anode and air (250 ccm) was supplied to the cathode, thereby generating electricity, and battery characteristics were measured. In this case, since an electrolyte doped with a phosphoric acid was used, performance of the fuel cell increased over time. Accordingly, evaluation was performed after aging was performed until the driving voltage reached its maximum value. An area of each of the cathode and the anode was fixed to 2.8×2.8=7.84 cm$^2$. Although thicknesses of the cathode and the anode vary due to non-uniformity of the carbon paper, the thickness of the cathode was about 430 μm and the thickness of the anode was about 390 μm.

Manufacturing Example 2

Manufacture of Fuel Cell

A fuel cell was manufactured in the same manner as in Manufacturing Example 1, except that the electrolytic membrane of Example 2 was used instead of the electrolytic membrane of Example 1.

The electrolytic membrane of Example 2 was analyzed based on a SEM image thereof. FIG. 1 shows a SEM image of the electrolytic membrane of Example 2. Referring to FIG. 1, it was confirmed that the electrolytic membrane of Example 2 has a few nano-size dots due to the inclusion of the compound represented by Formula 9.

Figure 2:
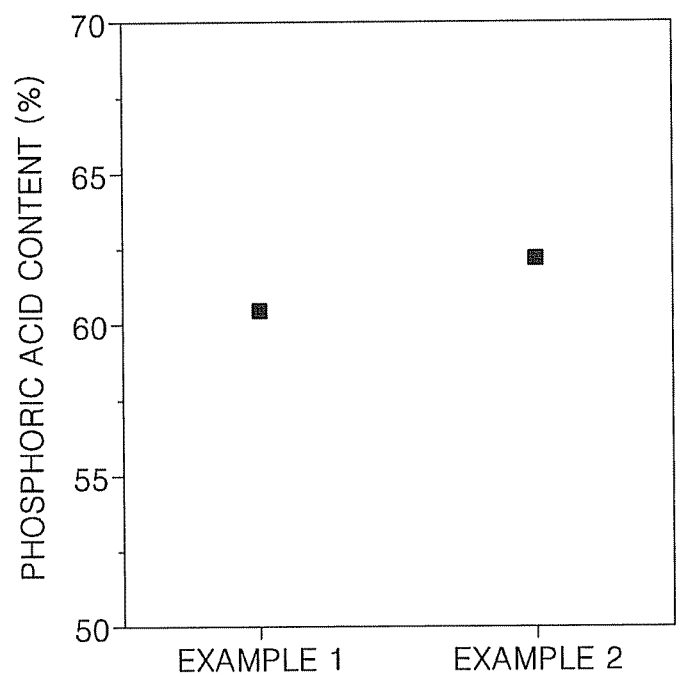
FIG. 2 is a graph of a phosphoric acid content of electrolytic membranes manufactured according to Examples 1 and 2.

Amounts of phosphoric acid contained in the electrolytic membranes manufactured according to Examples 1 and 2 were measured, and results thereof are shown in FIG. 2 and Table 1 below:

TABLE 1

| | W1(Wet) | W2 (dry) | W1 – W2 | (W1 – W2)/W1*100 phosphoric acid content (%) |
|---|---|---|---|---|
| Example 1 | 0.0534 | 0.0211 | 0.0323 | 60.49 |
| Example 2 | 0.0619 | 0.0234 | 0.0385 | 62.20 |

Referring to Table 1, W1(Wet) represents the weight of an electrolytic membrane after being impregnated with a phosphoric acid, and W1(Dry) represents the weight of an electrolytic membrane before being impregnated with a phosphoric acid.

Referring to Table 1 and FIG. 2, it was confirmed that the electrolytic membranes manufactured according to Examples 1 and 2 had high phosphoric acid contents.

Figure 3:
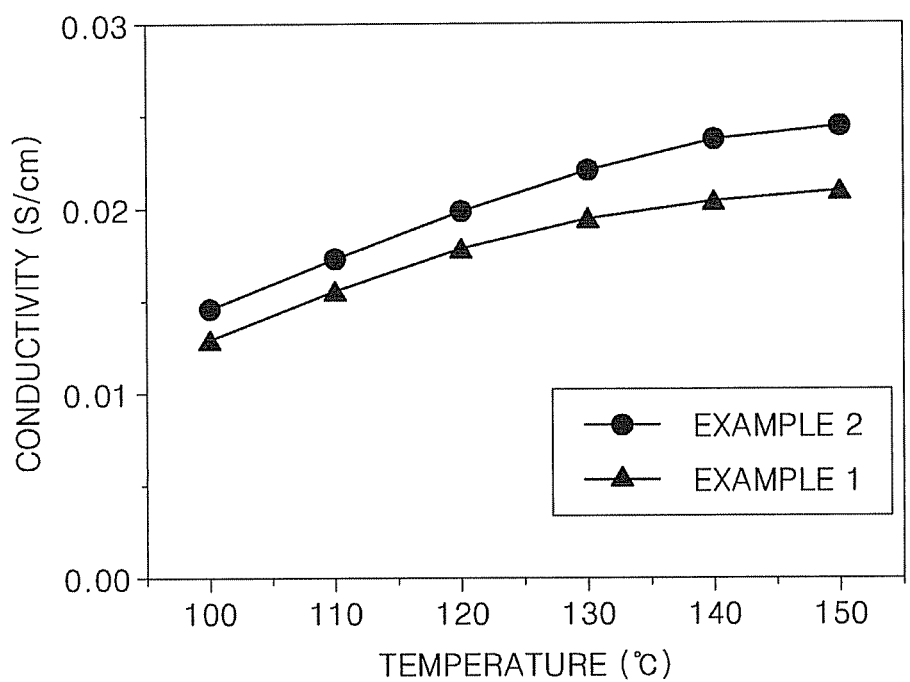
FIG. 3 is a graph showing conductivity characteristics of electrolytic membranes manufactured according to Examples 1 and 2.

Conductivity of the electrolytic membranes manufactured according to Examples 1 and 2 with respect to temperature was measured, and results thereof are shown in FIG. 3. Referring to FIG. 3, it was confirmed that the electrolytic membranes manufactured according to Examples 1 and 2 had excellent conductivity.

Processibility of the electrolytic membranes manufactured according to Examples 1 and 2 was evaluated by measuring dimensional change before and after processing. During the processibility test, ends of the electrolytic membranes manufactured according to Examples 1 and 2 were not rolled. Thus, it was confirmed that the electrolytic membranes manufactured according to Examples 1 and 2 had excellent processibility.

Figure 4:
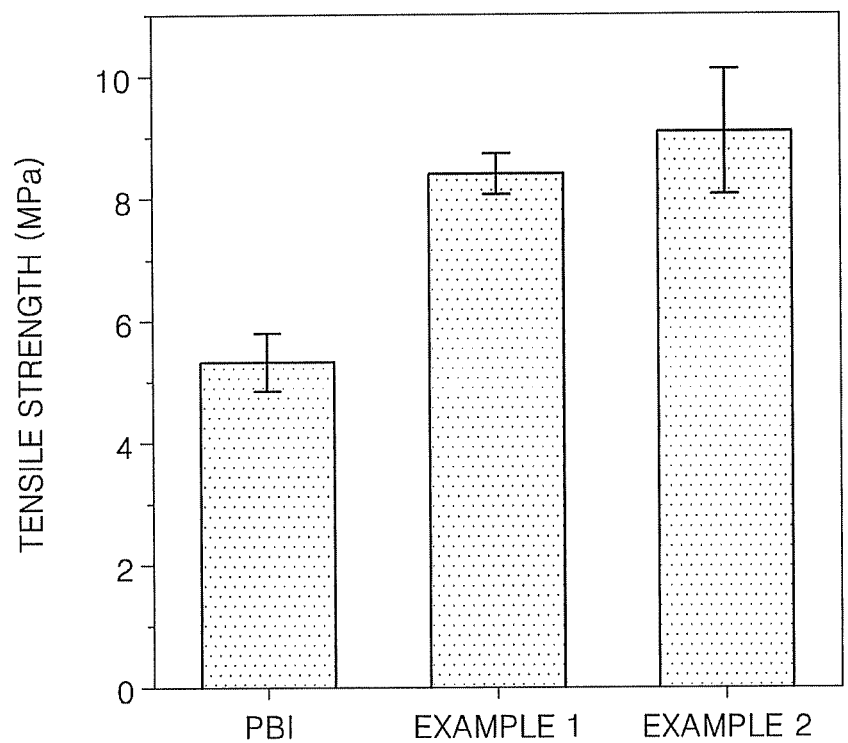
FIG. 4 is a graph showing tensile strength characteristics of electrolytic membranes manufactured according to Examples 1 and 2.

The tensile strength of the electrolytic membranes manufactured according to Examples 1 and 2 was evaluated, and results thereof are shown in FIG. 4. Referring to FIG. 4, results of the tensile strength of a PBI electrolytic membrane are also shown in comparison with those of the electrolytic membranes manufactured according to Examples 1 and 2.

The tensile strength of the electrolytic membranes was measured using a universal testing machine (UTM) (model name: Lloyd LR-10K), and samples all were manufactured according to ASTM standard D638 (Type V specimens) and evaluated. Referring to FIG. 4, it was confirmed that the electrolytic membranes manufactured according to Examples 1 and 2 had higher tensile strength than the PBI electrolytic membrane.

Figure 5:
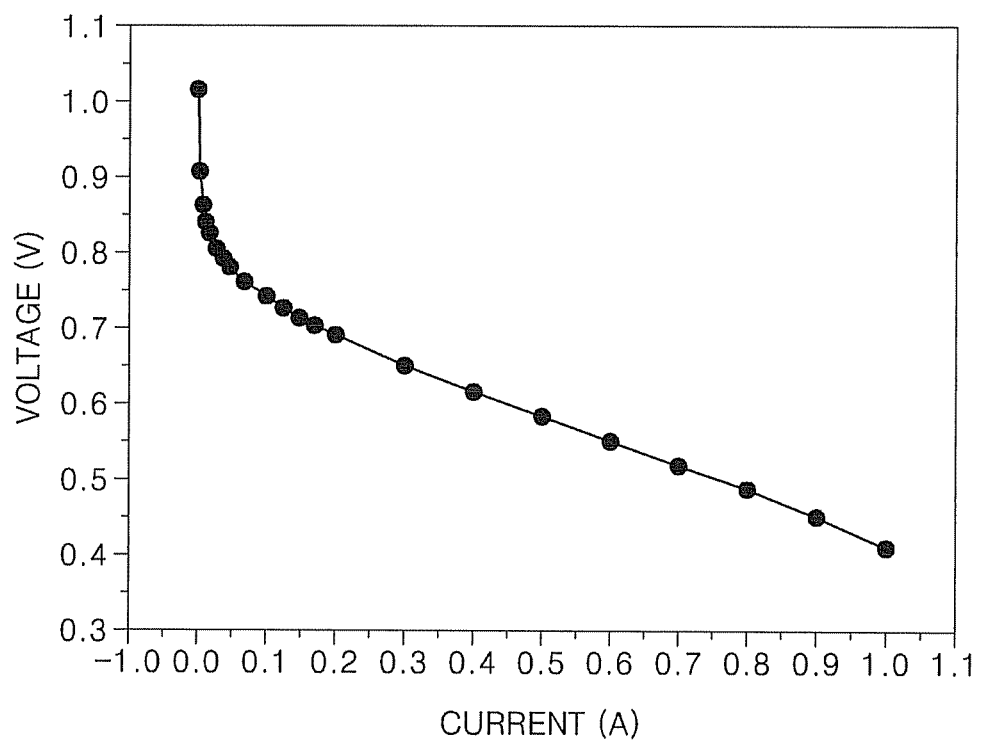
FIG. 5 is a graph showing cell voltage characteristics with respect to current density of a fuel cell manufactured according to Manufacturing Example 1.

The cell voltage change of the fuel cell manufactured according to Manufacturing Example 1 with respect to current was measured, and results thereof are shown in FIG. 5. Referring to FIG. 5, it was confirmed that the fuel cell manufactured according to Manufacturing Example 1 has excellent cell voltage characteristics.

The phosphoric acid contents, conductivity, tensile strength, and film state of the electrolytic membranes manufactured according to Examples 1 and 2, and fuel voltage of fuel cells manufactured according to Manufacturing Examples 1 and 2 are shown in Table 2 below.

TABLE 2

| | Example 1 & Manufacturing Example 1 | Example 2 & Manufacturing Example 2 |
|---|---|---|
| Phosphoric acid content (%) | 60.5 | 62.2 |
| Conductivity (at 150° C.) (S/cm) | 0.021 | 0.024 |
| Tensile strength (MPa) | 8.4 | 9.1 |
| Film state | No rolling | No rolling |
| Cell voltage (at 0.2 A) (V) | 0.692 | — |

As described above, the electrolytic membranes for a fuel cell according to the one or more of the above embodiments of the present invention have improved conductivity, and excellent mechanical properties and processibility due to a relatively high phosphoric acid content and prevention of leakage of phosphoric acid. Accordingly, fuel cells manufactured using the electrolytic membranes have improved cell performance.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. An electrolytic membrane for a fuel cell, the electrolytic membrane comprising:
  a polymer of a composition that comprises:
  a crystalline organic and inorganic porous composite; and
  at least one compound selected from the group consisting of compounds represented by Formulae 1 through 6 below:

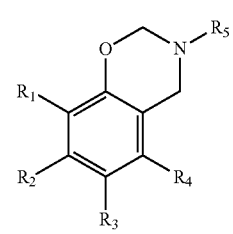

[Formula 1]

wherein in Formula 1, $R_1$, $R_2$, $R_3$ and $R_4$ are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, and $R_5$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group,

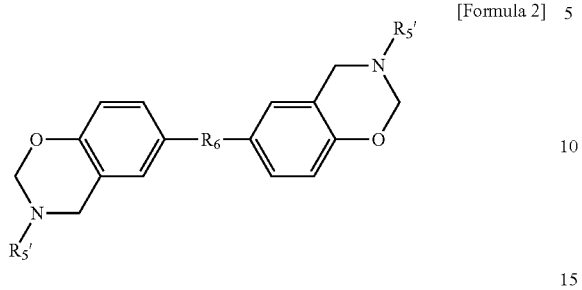

[Formula 2]

wherein in Formula 2, $R_5'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and $R_6$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(O)—, or —SO$_2$—,

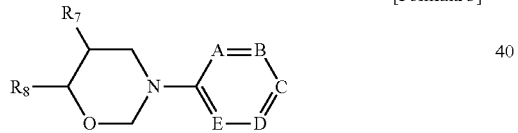

[Formula 3]

wherein in Formula 3, A, B, C, D, and E all are carbon atoms, or one or two selected from A, B, C, D, and E are nitrogen atoms (N), and the others are carbon atoms (C), and $R_7$ and $R_8$ are connected to each other to form a ring and the ring is a C6-C10 cycloalkyl group, a C3-C10 heteroaryl group, a fused C3-C10 heteroaryl group, a C3-C10 heterocyclic group, or a fused C3-C10 heterocyclic group,

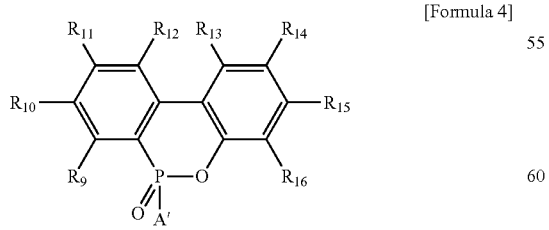

[Formula 4]

wherein in Formula 4, A' is a substituted or unsubstituted C1-C20 heterocyclic group, a substituted or unsubstituted C4-C20 cycloalkyl group, or a substituted or unsubstituted C1-C20 alkyl group, and $R_9$ to $R_{16}$ are each independently hydrogen, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

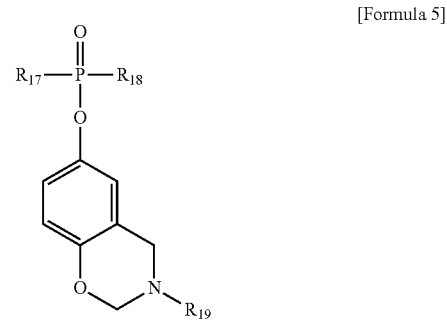

[Formula 5]

wherein in Formula 5, $R_{17}$ and $R_{18}$ are each independently a C1-C20 alkyl group, a C1-C20 alkoxy group, a C6-C20 aryl group, a C6-C20 aryloxy group, or a group represented by Formula 5A below:

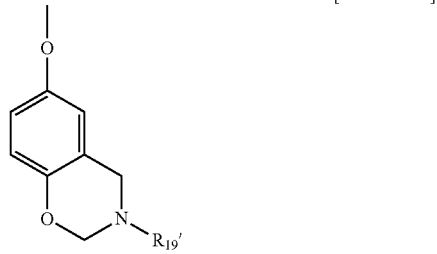

[Formula 5A]

wherein in Formulae 5 and 5A, $R_{19}$ and $R_{19'}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group, and

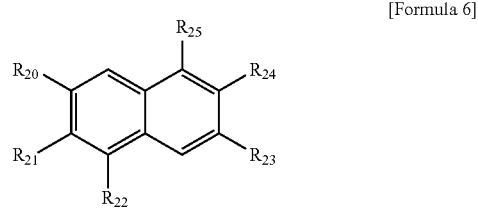

[Formula 6]

wherein in Formula 6, two or more neighboring groups selected from $R_{20}$, $R_{21}$ and $R_{22}$ are connected to form a ring represented by Formula 6A below, and the unselected groups selected from $R_{20}$, $R_{21}$ and $R_{22}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, two or more neighboring groups selected from $R_{23}$, $R_{24}$ and $R_{25}$ are connected to form a ring represented by Formula 6A below, and the unselected groups selected from $R_{23}$, $R_{24}$ and $R_{25}$ are each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group:

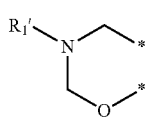

[Formula 6A]

wherein in Formula 6A, $R_1'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and

* represents a linking site for connection with two or more neighboring groups of $R_{20}$, $R_{21}$, and $R_{22}$ of Formula 6 or two or more neighboring groups of $R_{23}$, $R_{24}$, and $R_{25}$ of Formula 6.

2. The electrolytic membrane of claim 1, wherein the crystalline organic and inorganic porous composite is a compound represented by Formula 7 below:

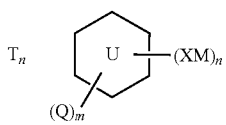

[Formula 7]

wherein in Formula 7,

is a substituted or unsubstituted C6-C20 aryl, a substituted or unsubstituted C2-C20 heteroaryl, a substituted or unsubstituted C4-C20 carbocycle, or a substituted or unsubstituted C2-C20 heterocycle, X is a proton-conducting anion, M is selected from the group consisting of $Mg^{2+}$, $Ca^{2+}$, $Sr^{2+}$, $Ba^{2+}$, $Sc^{3+}$, $Y^{3+}$, $Ti^{4+}$, $'Zr^{4+}$, $'Hf^{4+}$, $'V^{4+}$, $'V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$, and $Bi^{+}$, each Q is a mono-substituted or poly-substituted substituent and are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, T is a substituted or unsubstituted C6-C20 aryl, a substituted or unsubstituted C2-C20 heteroaryl, a substituted or unsubstituted C4-C20 carbocycle, or a substituted or unsubstituted C2-C20 heterocycle, m is a number from about 0 to about 6, and n is a number from about 0 to about 6.

3. The electrolytic membrane of claim 2, wherein T in Formula 7 is selected from groups represented by Formula 7A below:

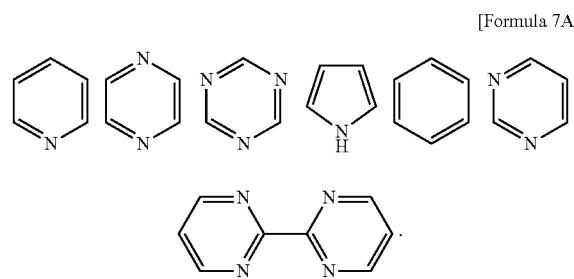

[Formula 7A]

4. The electrolytic membrane of claim 1, wherein the crystalline organic and inorganic porous composite is a compound represented by Formula 8 below:

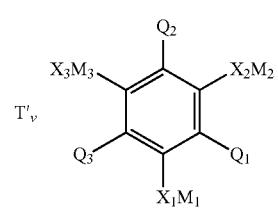

[Formula 8]

wherein in Formula 8, $X_1$ is $SO_3^-$, $PO_3^-$, a $COO^-$, or $OSO_3^-$, $M_1$, $M_2$ and $M_3$ are each independently $Na^+$, $H^+$, $Li^+$, $K^+$, $Rb^+$, $Cs^+$, or $Fr^+$, $Q_1$, $Q_2$ and Q are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, T' is selected from groups represented by Formula 7A below:

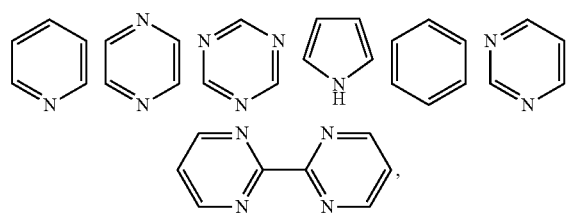

and

V is a number from about 0 to about 6.

5. The electrolytic membrane of claim 1, wherein the crystalline organic and inorganic porous composite is a compound represented by Formula 9:

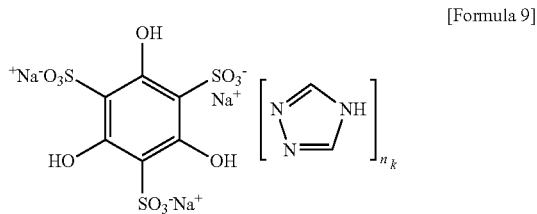

[Formula 9]

wherein in Formula 9, $n_k$ is a number from about 0.3 to about 0.6.

6. The electrolytic membrane of claim 1, wherein the amount of the crystalline organic and inorganic porous composite ranges from about 0.1 to about 90 parts by weight based on 100 parts by weight of at least one compound selected from the group consisting of the compound represented by Formula 1 and/or Formula 2.

7. The electrolytic membrane of claim 1, further comprising a cross-linkable compound.

8. The electrolytic membrane of claim 7, wherein the cross-linkable compound is at least one polymer selected from the group consisting of a polyazole-based material, polyimide, polypyrimidine, polyoxazole, polyimidazole, polybenzothiazole, polybenzoxazole, polyoxadiazole, polyquinoxaline, polythiadiazole, polypyridine, and polytetraazapyrene.

9. The electrolytic membrane of claim 7, wherein the amount of the cross-linkable compound is from about 5 to about 210 parts by weight based on 100 parts by weight of at least one compound selected from the group consisting of the compound represented by Formula 1 and/or Formula 2.

10. The electrolytic membrane of claim 7, wherein the cross-linkable compound comprises at least one compound selected from groups represented by Formulae 10 to 12 below:

[Formula 10]

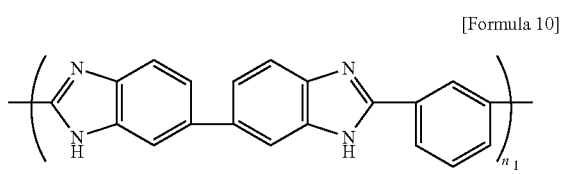

wherein in Formula 10, $n_1$ is an integer of 10 or more,

[Formula 11]

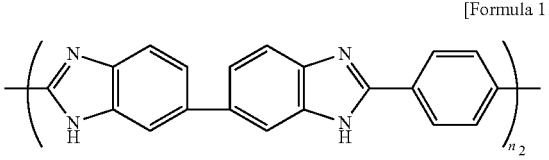

wherein in Formula 11, $n_2$ is an integer of 10 or more, and

[Formula 12]

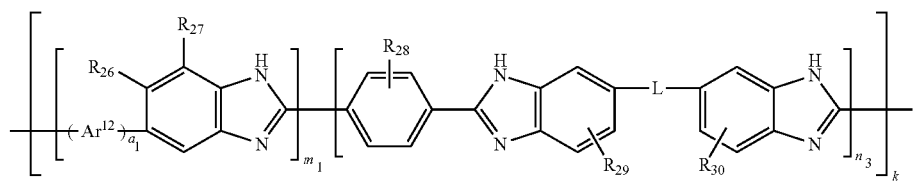

wherein in Formula 12, $R_{26}$ and $R_{27}$ are each independently hydrogen, a substituted or unsubstituted C1-C20 alkyl group, a substituted or unsubstituted C1-C20 alkoxy group, a substituted or unsubstituted C6-C20 aryl group, a substituted or unsubstituted C6-C20 aryloxy group, a substituted or unsubstituted C3-C20 heteroaryl group, a substituted or unsubstituted C3-C20 heteroaryloxy group, or $R_{26}$ and $R_{27}$ are connected to form a C4-C20 carbocycle or C3-C20 heterocycle, $Ar^{12}$ is a substituted or unsubstituted C6-C20 arylene group or a substituted or unsubstituted C3-C20 heteroarylene group, $R_{28}$ to $R_{30}$ are each a mono-substituted or poly-substituted substituent, and are each independently hydrogen, a substituted or unsubstituted C1-C20 alkyl group, a substituted or unsubstituted C1-C20 alkoxy group, a substituted or unsubstituted C6-C20 aryl group, a substituted or unsubstituted C6-C20 aryloxy group, a substituted or unsubstituted C3-C20 heteroaryl group, or a substituted or unsubstituted C3-C20 heteroaryloxy group, L represents a linker, $m_1$ is a number from about 0.01 to about 1, $a_1$ is about 0 or about 1, $n_3$ is a number from about 0 to about 0.99, and k is a number from about 10 to about 250.

11. A fuel cell comprising: a cathode, an anode and an electrolytic membrane interposed between the cathode and the anode, wherein the electrolytic membrane is the electrolytic membrane of claim 1.

12. The fuel cell of claim 11, wherein at least one of the cathode and the anode comprises: a composition comprising a crystalline organic and inorganic porous composite and at least one compound selected from the group consisting of compounds represented by Formulae 1 through 6 below, or a polymer as a polymerization product of the composition,

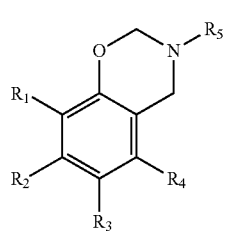

[Formula 1]

wherein in Formula 1, $R_1$, $R_2$, $R_3$ and $R_4$ are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, and $R_5$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group,

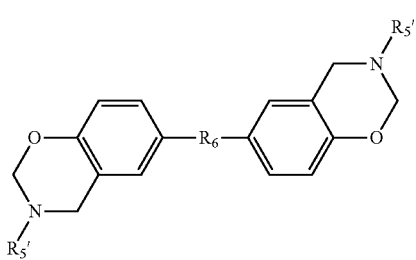

[Formula 2]

wherein in Formula 2, $R_5'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and $R_6$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(O)—, or —$SO_2$—,

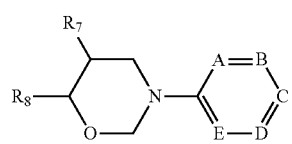

[Formula 3]

wherein in Formula 3, A, B, C, D, and E all are carbon atoms, or one or two selected from A, B, C, D, and E are nitrogen atoms (N), and the others are carbon atoms (C), and $R_7$ and $R_8$ are connected to each other to form a ring and the ring is a C6-C10 cycloalkyl group, a C3-C10 heteroaryl group, a fused C3-C10 heteroaryl group, a C3-C10 heterocyclic group, or a fused C3-C10 heterocyclic group,

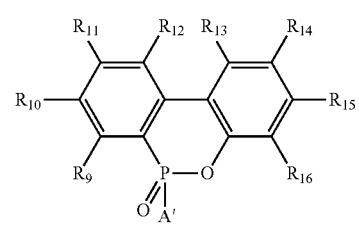

[Formula 4]

wherein in Formula 4, A' is a substituted or unsubstituted C1-C20 heterocyclic group, a substituted or unsubstituted C4-C20 cycloalkyl group, or a substituted or unsubstituted C1-C20 alkyl group, and $R_9$ to $R_{16}$ are each independently hydrogen, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

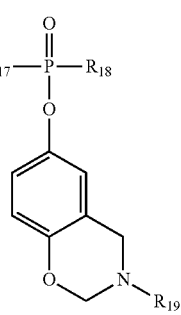

[Formula 5]

wherein in Formula 5, $R_{17}$ and $R_{18}$ are each independently a C1-C20 alkyl group, a C1-C20 alkoxy group, a C6-C20 aryl group, a C6-C20 aryloxy group, or a group represented by Formula 5A below:

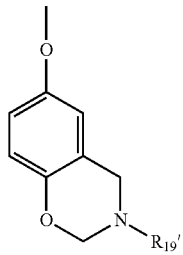

[Formula 5A]

wherein in Formulae 5 and 5A, $R_{19}$ and $R_{19'}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group, and

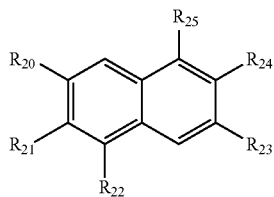

[Formula 6]

wherein in Formula 6, two or more neighboring groups selected from $R_{20}$, $R_{21}$ and $R_{22}$ are connected to form a ring represented by Formula 6A below, and the unselected groups selected from $R_{20}$, $R_{21}$ and $R_{22}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, two or more neighboring groups selected from $R_{23}$, $R_{24}$ and $R_{25}$ are connected to form a ring represented by Formula 6A below, and the unselected groups selected from $R_{23}$, $R_{24}$ and $R_{25}$ are each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group:

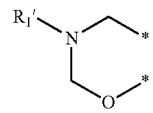

[Formula 6A]

wherein in Formula 6A, $R_1'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and

* represents a linking site for connection with two or more neighboring groups of $R_{20}$, $R_{21}$, and $R_{22}$ of Formula 6 or two or more neighboring groups of $R_{23}$, $R_{24}$, and $R_{25}$ of Formula 6.

13. An electrode for a fuel cell, the electrode comprising:
a composition comprising a crystalline organic and inorganic porous composite and at least one compound selected from the group consisting of compounds represented by Formulae 1 through 6 below, or a polymer as a polymerization product of the composition:

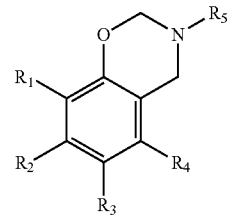

[Formula 1]

wherein in Formula 1, $R_1$, $R_2$, $R_3$ and $R_4$ are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, and $R_5$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group,

[Formula 2]

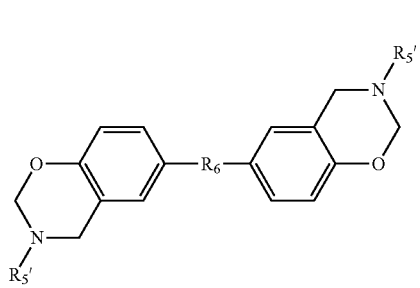

wherein in Formula 2, $R_5'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and $R_6$ is a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(O)—, or —SO$_2$—,

[Formula 3]

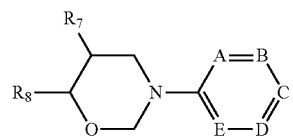

wherein in Formula 3, A, B, C, D, and E all are carbon atoms, or one or two selected from A, B, C, D, and E are nitrogen atoms (N), and the others are carbon atoms (C), and $R_7$ and $R_8$ are connected to each other to form a ring and the ring is a C6-C10 cycloalkyl group, a C3-C10 heteroaryl group, a fused C3-C10 heteroaryl group, a C3-C10 heterocyclic group, or a fused C3-C10 heterocyclic group,

[Formula 4]

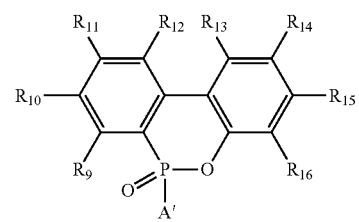

wherein in Formula 4, A' is a substituted or unsubstituted C1-C20 heterocyclic group, a substituted or unsubstituted C4-C20 cycloalkyl group, or a substituted or unsubstituted C1-C20 alkyl group, and $R_9$ to $R_{16}$ are each independently hydrogen, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

[Formula 5]

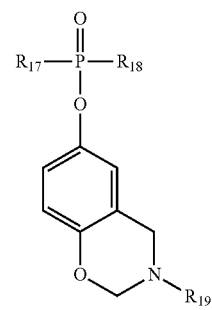

wherein in Formula 5, $R_{17}$ and $R_{18}$ are each independently a C1-C20 alkyl group, a C1-C20 alkoxy group, a C6-C20 aryl group, a C6-C20 aryloxy group, or a group represented by Formula 5A below:

[Formula 5A]

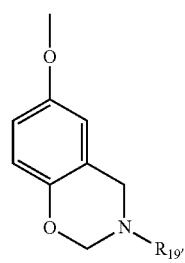

wherein in Formulae 5 and 5A, $R_{19}$ and $R_{19'}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group, and

[Formula 6]

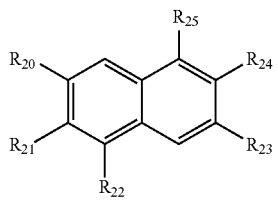

wherein in Formula 6, two or more neighboring groups selected from $R_{20}$, $R_{21}$ and $R_{22}$ are connected to form a ring represented by Formula 6A below, and the unselected groups selected from $R_{20}$, $R_{21}$ and $R_{22}$ are each independently hydrogen, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, two or more neighboring groups selected from $R_{23}$, $R_{24}$ and $R_{25}$ are connected to form a ring represented by Formula 6A below, and the unselected groups selected from $R_{23}$, $R_{24}$ and $R_{25}$ are each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group:

[Formula 6A]

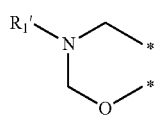

wherein in Formula 6A, $R_1'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocycloalkyl group, a substituted or unsubstituted C2-C20 heterocyclic group, or a substituted or unsubstituted C2-C20 heterocycloalkyl group, and

* represents a linking site for connection with two or more neighboring groups of $R_{20}$, $R_{21}$, and $R_{22}$ of Formula 6 or two or more neighboring groups of $R_{23}$, $R_{24}$, and $R_{25}$ of Formula 6.

14. The electrode of claim 13, wherein the crystalline organic and inorganic porous composite is a compound represented by Formula 7 below:

[Formula 7]

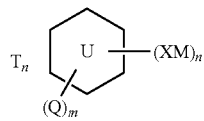

wherein in Formula 7,

is a substituted or unsubstituted C6-C20 aryl, a substituted or unsubstituted C2-C20 heteroaryl, a substituted or unsubstituted C4-C20 carbocycle, or a substituted or unsubstituted C2-C20 heterocycle, X is a proton-conducting anion, M is selected from the group consisting of $Mg^{2+}$, $Ca^{2+}$, $Sr^{2+}$, $Ba^{2+}$, $Sc^{3+}$, $Y^{3+}$, $Ti^{4+}$, $'Zr^{4+}$, $'Hf^{4+}$, $'V^{4+}$, $'V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$, and $Bi^{+}$, each Q is a mono-substituted or poly-substituted substituent and are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, T is a substituted or unsubstituted C6-C20 aryl, a substituted or unsubstituted C2-C20 heteroaryl, a substituted or unsubstituted C4-C20 carbocycle, or a substituted or unsubstituted C2-C20 heterocycle, m is a number from about 0 to about 6, and n is a number from about 0 to about 6.

15. The electrode of claim 13, wherein the crystalline organic and inorganic porous composite is a compound represented by Formula 8 below:

[Formula 8]

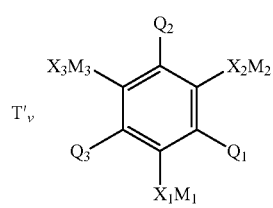

wherein in Formula 8, $X_1$ is $SO_3^-$, $PO_3^-$, a $COO^-$, or $OSO_3^-$, $M_1$, $M_2$ and $M_3$ is each independently $Na^+$, $H^+$, $Li^+$, $K^+$, $Rb^+$, $Cs^+$, or $Fr^+$, $Q_1$, $Q_2$ and $Q_3$ are each independently hydrogen, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclicoxy group, a substituted or unsubstituted C2-C20 heterocyclic group, a halogen atom, a hydroxy group, or a cyano group, T' is selected from groups represented by Formula 7A below:

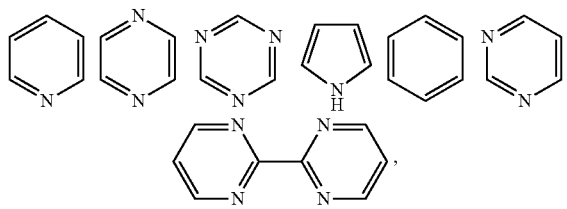

and

V is a number from about 0 to about 6.

16. The electrode of claim 13, wherein the crystalline organic and inorganic porous composite is a compound represented by Formula 9 below:

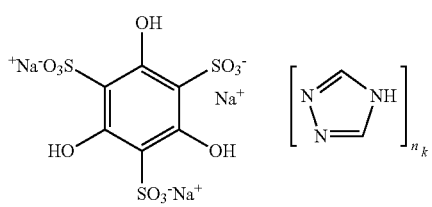

[Formula 9]

wherein in Formula 9, $n_k$ is a number from about 0.3 to about 0.6.

17. The electrode of claim 13, wherein the amount of the crystalline organic and inorganic porous composite ranges from about 0.1 to about 90 parts by weight based on 100 parts by weight of at least one compound selected from the group consisting of the compound represented by Formula 1 and/or Formula 2.

18. The electrode of claim 13, further comprising a cross-linkable compound comprising at least one polymer selected from the group consisting of a polyazole-based material, polyimide, polypyrimidine polyoxazole, polyimidazole, polybenzothiazole, polybenzoxazole, polyoxadiazole, polyquinoxaline, polythiadiazole, polypyridine, and polytetraazapyrene.

19. The electrode of 18, wherein the cross-linkable compound is at least one compound selected from groups represented by Formulae 10 to 12 below:

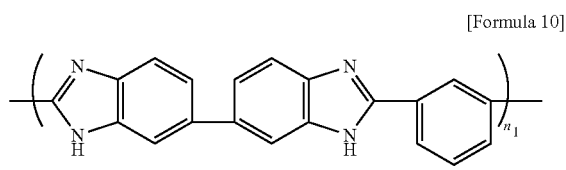

[Formula 10]

wherein in Formula 10, $n_1$ is an integer of 10 or more,

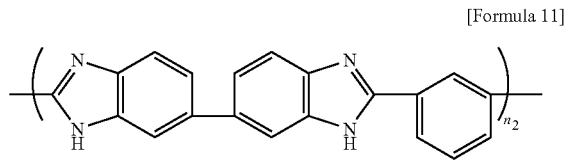

[Formula 11]

wherein in Formula 11, $n_2$ is an integer of 10 or more, and

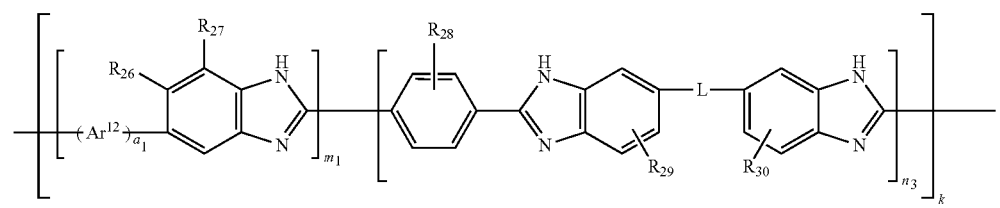

[Formula 12]

wherein in Formula 12, $R_{26}$ and $R_{27}$ are each independently hydrogen, a substituted or unsubstituted C1-C20 alkyl group, a substituted or unsubstituted C1-C20 alkoxy group, a substituted or unsubstituted C6-C20 aryl group, a substituted or unsubstituted C6-C20 aryloxy group, a substituted or unsubstituted C3-C20 heteroaryl group, a substituted or unsubstituted C3-C20 heteroaryloxy group, or $R_{26}$ and $R_{27}$ are connected to form a C4-C20 carbocycle or C3-C20 heterocycle, $Ar^{12}$ is a substituted or unsubstituted C6-C20 arylene group or a substituted or unsubstituted C3-C20 heteroarylene group, $R_{28}$ to $R_{30}$ are each a mono-substituted or poly-substituted substituent, and are each independently hydrogen, a substituted or unsubstituted C1-C20 alkyl group, a substituted or unsubstituted C1-C20 alkoxy group, a substituted or unsubstituted C6-C20 aryl group, a substituted or unsubstituted C6-C20 aryloxy group, a substituted or unsubstituted C3-C20 heteroaryl group, or a substituted or unsubstituted C3-C20 heteroaryloxy group, L represents a linker, $m_1$ is a number from about 0.01 to about 1, $a_1$ is about 0 or about 1,
$n_3$ is a number from about 0 to about 0.99, and
k is a number from about 10 to about 250.

20. A fuel cell comprising a cathode, an anode, and an electrolytic membrane interposed between the cathode and the anode, wherein at least one of the cathode and the anode is the electrode of claim 13.

* * * * *